United States Patent
Sakata

(10) Patent No.: US 11,995,845 B2
(45) Date of Patent: May 28, 2024

(54) EVALUATION METHOD, STORAGE MEDIUM, AND INFORMATION PROCESSING APPARATUS

(71) Applicant: FUJITSU LIMITED, Kawasaki (JP)

(72) Inventor: Masato Sakata, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 327 days.

(21) Appl. No.: 17/683,151

(22) Filed: Feb. 28, 2022

(65) Prior Publication Data

US 2022/0189042 A1 Jun. 16, 2022

Related U.S. Application Data

(63) Continuation of application No. PCT/JP2019/038638, filed on Sep. 30, 2019.

(51) Int. Cl.
*G06K 9/00* (2022.01)
*A63B 24/00* (2006.01)
(Continued)

(52) U.S. Cl.
CPC .......... *G06T 7/251* (2017.01); *A63B 24/0062* (2013.01); *G06T 7/13* (2017.01);
(Continued)

(58) Field of Classification Search
CPC . G06T 7/251; G06T 7/13; G06T 2207/10028; G06T 2207/20081;
(Continued)

(56) References Cited

U.S. PATENT DOCUMENTS

| 9,067,097 B2 * | 6/2015 | Lane | G06V 40/23 |
| 9,322,653 B2 * | 4/2016 | Sigal | G06V 40/23 |

(Continued)

FOREIGN PATENT DOCUMENTS

| JP | 2018-068516 A | 5/2018 |
| JP | 2019-097732 A | 6/2019 |

(Continued)

OTHER PUBLICATIONS

JPOA—Japanese Office Action mailed Oct. 4, 2022 for corresponding Japanese Patent Application No. 2021-550781 with Machine Translation. **Reference WO2019/116495 cited in the JPOA was previously submitted in the IDS filed on Feb. 28, 2022.
International Search Report and Written Opinion of the International Searching Authority (Form PCT/ISA/210, 220, and 237), mailed in connection with PCT/JP2019/038638 and mailed Dec. 10, 2019 (Total 13 pages).

\* cited by examiner

*Primary Examiner* — Shervin K Nakhjavan
(74) *Attorney, Agent, or Firm* — Fujitsu Intellectual Property Center

(57) ABSTRACT

An evaluation method for a computer to execute a process includes, acquiring a plurality of pieces of skeleton information in time series based on position information of joints of an object that executes a plurality of motions; specifying a transition period between a first motion and a second motion that follows the first motion, which are included in the plurality of motions based on the plurality of pieces of skeleton information; determining whether the transition period is related to a certain combination of motions by inputting skeleton information among the plurality of pieces of skeleton information that corresponds to the transition period into an evaluation model trained to evaluate a transition period between motions based on a plurality of pieces of skeleton information in time series; and outputting an evaluation result of the transition period by the evaluation model.

13 Claims, 21 Drawing Sheets

(51) Int. Cl.
*G06T 7/13* (2017.01)
*G06T 7/246* (2017.01)
*A63B 71/06* (2006.01)

(52) U.S. Cl.
CPC ............... *A63B 2024/0068* (2013.01); *A63B 2024/0071* (2013.01); *A63B 71/0605* (2013.01); *A63B 2220/05* (2013.01); *G06T 2207/10028* (2013.01); *G06T 2207/20081* (2013.01); *G06T 2207/30196* (2013.01); *G06T 2207/30221* (2013.01)

(58) Field of Classification Search
CPC . G06T 2207/30196; G06T 2207/30221; G06T 2207/20044; G06T 2207/20084; A63B 24/0062; A63B 71/0605; A63B 2024/0068; A63B 2024/0071; A63B 2220/05; G06V 10/82; G06V 40/23; G09B 19/0038
See application file for complete search history.

(56) References Cited

U.S. PATENT DOCUMENTS

| | | | |
|---|---|---|---|
| 9,358,456 B1* | 6/2016 | Challinor | A63F 13/44 |
| 9,754,400 B2* | 9/2017 | Otto | G06T 17/00 |
| 10,262,423 B2* | 4/2019 | Pathak | A61B 5/0022 |
| 10,388,053 B1* | 8/2019 | Carter, Jr. | G06T 13/80 |
| 10,628,664 B2* | 4/2020 | Elwazer | G06V 40/23 |
| 11,763,464 B2* | 9/2023 | Ohashi | G06V 40/28 |
| | | | 382/103 |
| 11,887,232 B2* | 1/2024 | Phan | G06N 3/0464 |
| 2010/0134501 A1* | 6/2010 | Lowe | G06T 13/40 |
| | | | 345/473 |
| 2014/0145936 A1* | 5/2014 | Gu | G06F 3/005 |
| | | | 345/156 |
| 2019/0220657 A1 | 7/2019 | Yabuki et al. | |
| 2020/0302617 A1 | 9/2020 | Yabuki | |
| 2022/0335625 A1* | 10/2022 | Shimizu | A61B 5/16 |

FOREIGN PATENT DOCUMENTS

| | | |
|---|---|---|
| WO | 2018/069981 A1 | 4/2018 |
| WO | 2018/070414 A1 | 4/2018 |
| WO | 2019/116495 A1 | 6/2019 |

FIG. 5

| FRAME | IMAGE INFORMATION | SKELETON INFORMATION |
|---|---|---|
| 1 | IMAGE DATA A1 | HEAD(X3,Y3,Z3), ⋯ |
| ⋯ | ⋯ | ⋯ |

FIG. 6

| element | motion | start | end |
|---|---|---|---|
| 0 | none | 57 | 186 |
| 1.105 | element | 186 | 211 |
| 0 | none | 211 | 710 |
| 5.204 | element | 710 | 727 |
| 0 | combination | 727 | 741 |
| 5.312 | element | 741 | 757 |
| 0 | none | 757 | 1002 |
| 5.409 | element | 1002 | 1025 |
| 0 | none | 1025 | 1057 |

FIG. 15
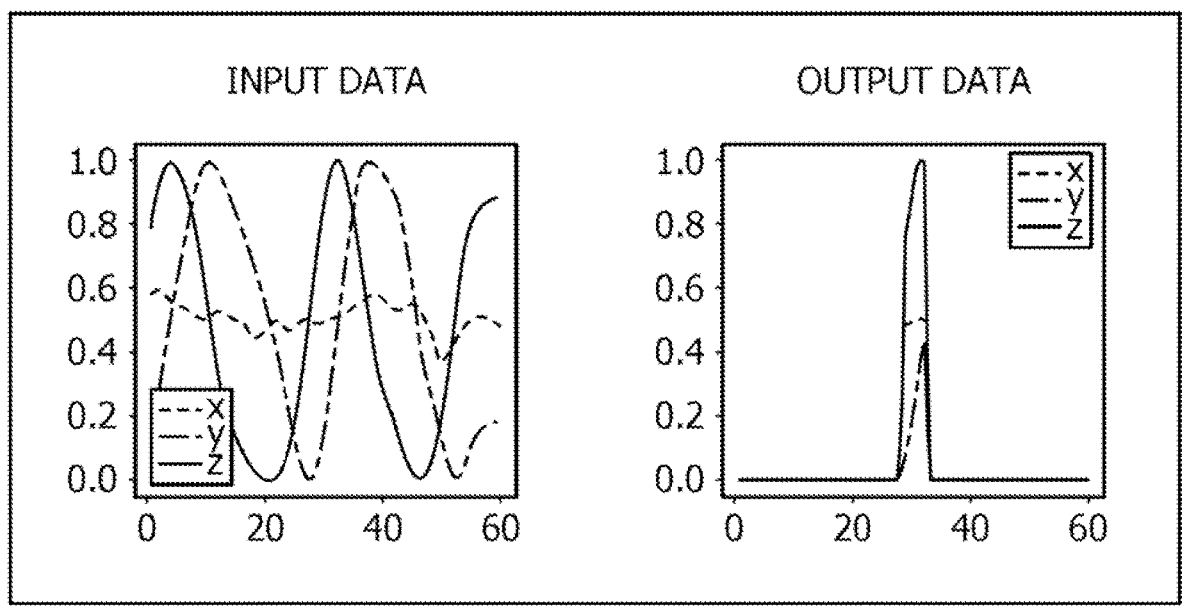
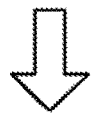
OUTPUT RESULT OF WHETHER OR NOT COMBINATION IS
INCLUDED ⋯ 1.00 (WITH COMBINATION)

FIG. 16
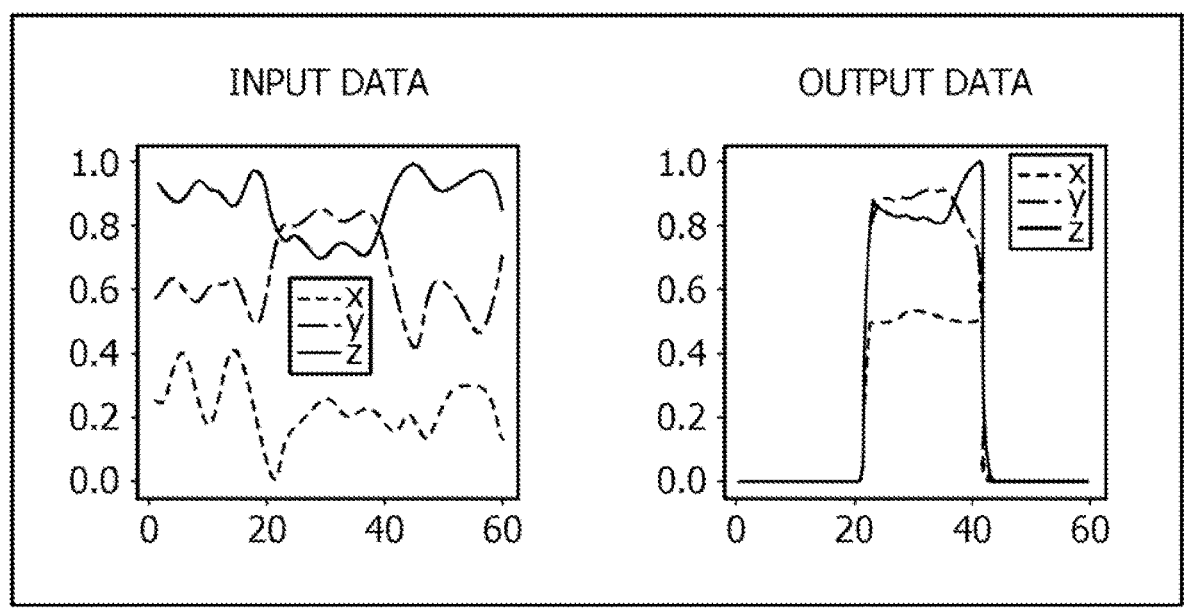
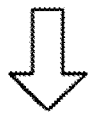
OUTPUT RESULT OF WHETHER OR NOT COMBINATION
IS INCLUDED ⋯ 0.01 (WITHOUT COMBINATION) →
EXTRA ARM SWING

EVALUATION METHOD, STORAGE MEDIUM, AND INFORMATION PROCESSING APPARATUS

CROSS-REFERENCE TO RELATED APPLICATION

This application is a continuation application of International Application PCT/JP2019/038638 filed on Sep. 30, 2019 and designated the U.S., the entire contents of which are incorporated herein by reference.

FIELD

The present invention relates to an evaluation method, a storage medium, and an information processing apparatus.

BACKGROUND

In a wide range of fields such as gymnastics and medical care, by using skeleton information of a person such as an athlete or a patient, recognition of a motion of the person is automatically performed. Specifically, taking gymnastics as an example, a technology of automatically recognizing an element of a performer as an example of a motion, performing automatic scoring, and evaluating a performance of the subject is used.

For example, a plurality of frames including position information of feature points corresponding to predetermined parts or joint parts of a performer is segmented in time series on the basis of positions of the parts, thereby classifying the plurality of frames into a plurality of groups in time series. Then, for each group, a type of a basic exercise corresponding to the group is identified on the basis of motions of the feature points included in continuous frames. Thereafter, elements and difficulty of an exercise performed by the performer are evaluated on the basis of an order of the types of the basic exercise s corresponding to the groups continuous in time series.

Patent Document 1: International Publication Pamphlet No. WO 2018/070414

SUMMARY

According to an aspect of the embodiments, an evaluation method for a computer to execute a process includes, acquiring a plurality of pieces of skeleton information in time series based on position information of joints of an object that executes a plurality of motions; specifying a transition period between a first motion and a second motion that follows the first motion, which are included in the plurality of motions based on the plurality of pieces of skeleton information; determining whether the transition period is related to a certain combination of motions by inputting skeleton information among the plurality of pieces of skeleton information that corresponds to the transition period into an evaluation model trained to evaluate a transition period between motions based on a plurality of pieces of skeleton information in time series; and outputting an evaluation result of the transition period by the evaluation model.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram for describing skeleton data.

FIG. 6 is a diagram for describing frame information.

FIG. 15 is a diagram illustrating an example of verification in which it is determined that a combination is included.

FIG. 16 is a diagram illustrating an example of verification in which it is determined that a combination is not included.

DESCRIPTION OF EMBODIMENTS

With the technology described above, it is not possible to evaluate a transition portion between motions. For example, in scoring competitions such as gymnastics, it is needed to evaluate the transition portion that is not an element, in addition to scoring a motion (element) alone. This is because, depending on the evaluation of the transition portion, additional points such as a connection value (CV) may be obtained in addition to basic points of elements for elements that sandwich the transition portion in a case where the transition meets a predetermined condition.

Furthermore, in rehabilitation or the like, it may be expected that a degree of recovery of a subject may be evaluated more accurately by evaluating a transition portion that is not walking in addition to evaluation of a predetermined motion (walking) alone. In this way, it is needed to evaluate, in addition to a motion, a transition portion between motions. However, in the technology described above, since an element or the like of a performer corresponding to a type of a basic exercise is specified, even if other than the basic exercise is extracted, it is not possible to specify whether the extracted portion is a transition portion or another motion, and it is also not possible to perform accurate evaluation.

In one aspect, an object is to provide an evaluation method, an evaluation program, and an information processing apparatus that may evaluate a transition portion between motions.

According to one embodiment, it is possible to evaluate a transition portion between motions.

Hereinafter, embodiments of an evaluation method, an evaluation program, and an information processing apparatus according to the present invention will be described in detail with reference to the drawings. Note that the embodiments do not limit the present invention. Furthermore, each of the embodiments may be appropriately combined within a range without inconsistency.

First Embodiment

[Overall Configuration]

Figure 1:
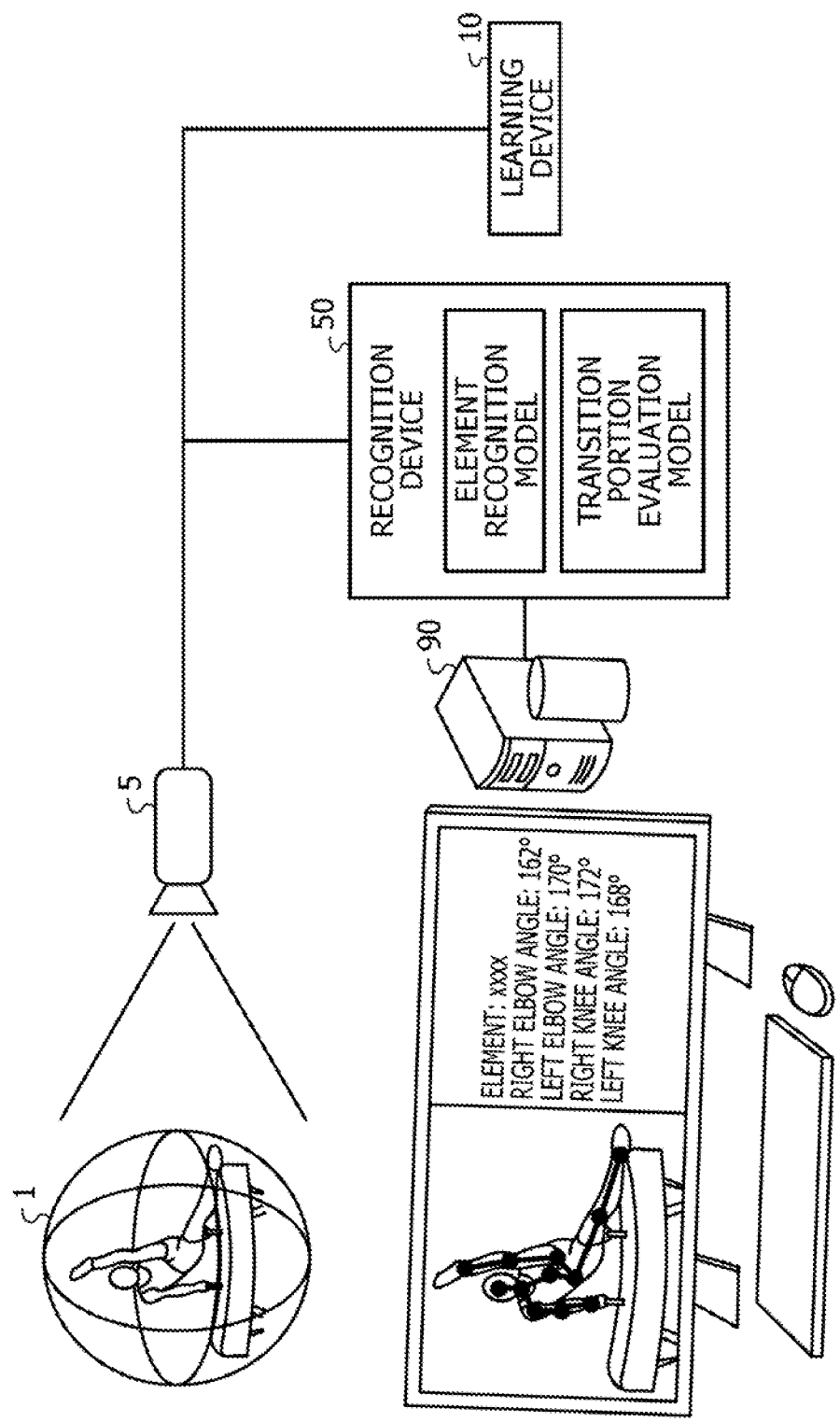
FIG. 1 is a diagram illustrating an example of an overall configuration of a system according to a first embodiment.

FIG. 1 is a diagram illustrating an example of an overall configuration of a system according to a first embodiment. As illustrated in FIG. 1, this system includes a three-dimensional (3D) laser sensor 5, a learning device 10, a recognition device 50, and a scoring device 90, captures three-dimensional data of a performer 1 who is an object, recognizes a skeleton and the like, and accurately scores elements. Note that, in the present embodiment, as an example, an example of recognizing skeleton information of a performer in a gymnastics competition will be described.

Generally, a current scoring method in a gymnastics competition is visually performed by a plurality of graders. However, with sophistication of elements, there are increasing cases where it is difficult for the graders to visually perform scoring. In recent years, an automatic scoring system and a scoring support system for scoring competitions using a 3D laser sensor have been known. For example, in these systems, the 3D laser sensor acquires a distance image, which is three-dimensional data of an athlete, and recognizes a skeleton, which is an orientation of each joint, an angle of each joint, and the like of the athlete from the distance image. Then, in the scoring support system, a result of the skeleton recognition is displayed by a 3D model, so that the graders are supported to perform more accurate scoring by, for example, confirming a detailed situation of the performer. Furthermore, in the automatic scoring system, a performed element or the like is recognized from the result of the skeleton recognition, and scoring is performed according to a scoring rule.

In such gymnastics competitions, there are two types of scores: a D score, which indicates a total score of elements performed during a performance, and an E score, which indicates a result of the performance, and judges are assigned to each scoring. Elements are components of calculation of the D score, each of the elements is given a difficulty level such as A or B, and points to be added are different according to the difficulty level. Moreover, for some competitions such as women's balance beam, floor exercise, uneven bars, and men's floor exercise and horizontal bar, scoring is performed according to a combination of elements. For example, in the case of the balance beam, a combination of certain types of elements is required as a part of a compositional requirement (CR), and there is a mechanism of adding a connection value (CV) and a series bonus (SB) in a case where a combination of elements with a certain difficulty level or higher is approved.

Thus, in order to perform automatic scoring, there is a need for a mechanism that automatically discriminates elements and a combination performed by an athlete from motions. In other words, in order to improve accuracy and reliability of the automatic scoring system, it is required not only to automatically recognize elements but also to accurately evaluate a transition portion between the elements and to accurately discriminate whether or not the transition portion corresponds to a combination of the elements.

Here, as a method for automatically recognizing an element of a gymnastics competition, a model is used in which a distance image, which is three-dimensional data of an athlete, is input and the element is automatically recognized. As such a model, a method of defining a feature amount of an element is common, and for example, a method of performing automatic recognition on a rule base and a method of using a learning model in which a distance image or a transition of a distance image is machine-learned as learning data are known.

On the other hand, according to scoring rules, a combination between elements means that there is no performance of "stop between elements, extra step between elements, contact of a foot with a beam between elements, loss of balance between elements, apparent stretch of a leg or hip in a first element before takeoff of a second element, an extra arm swing", or the like in a transition portion. It is difficult to manually define all feature amounts of such motions, and it is difficult to evaluate a transition portion on a rule base and detect a combination. Moreover, taking the balance beam as an example, there are various patterns of combinations such as combinations of acrobatics types (acro), combinations of dance types (jump, hop, and turn), and a mixture of an acro and a dance. Thus, it is difficult to manually classify cases and make rules for all the cases.

Thus, in the first embodiment, deep learning is adopted as a method which does not involve manual definition of a feature amount. For example, the recognition device 50 executes recognition of an element and evaluation of a transition portion by using an element recognition model that performs recognition of an element and a transition portion evaluation model that evaluates a transition portion.

Specifically, the element recognition model performs preprocessing on skeleton information acquired in time series, and outputs an element recognition result by using relative coordinate data and edge data obtained by the preprocessing as inputs. The transition portion evaluation model performs preprocessing on skeleton information of a transition portion corresponding to an interval between elements, and outputs likelihood indicating whether or not the transition portion corresponds to a combination between the elements by using relative coordinate data and edge data obtained by the preprocessing as inputs.

In this way, the recognition device 50 according to the first embodiment recognizes a motion (element) on the basis of skeleton information in time series, and automatically evaluates a transition portion between motions (combination of elements).

[Functional Configuration]

Next, a functional configuration of each device of the system illustrated in FIG. 1 will be described. Note that, here, each of the learning device 10, the recognition device 50, and the scoring device 90 will be described.

(Configuration of Learning Device 10)

Figure 2:
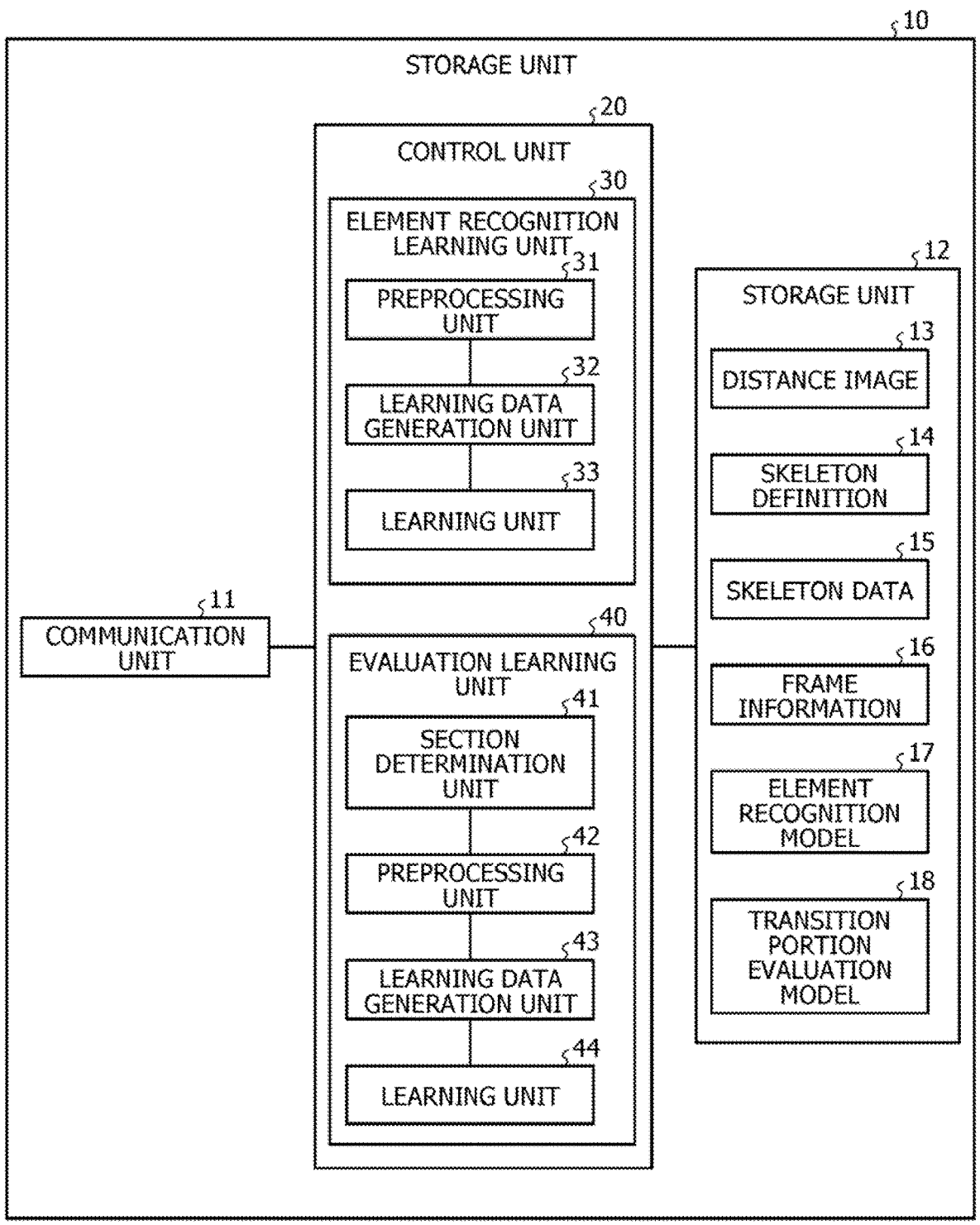
FIG. 2 is a functional block diagram illustrating a functional configuration of a learning device according to the first embodiment.

FIG. 2 is a functional block diagram illustrating a functional configuration of the learning device 10 according to the first embodiment. As illustrated in FIG. 2, the learning device 10 includes a communication unit 11, a storage unit 12, and a control unit 20.

The communication unit 11 is a processing unit that controls communication with another device, and is, for example, a communication interface. For example, the communication unit 11 receives a distance image of the performer 1 captured by the 3D laser sensor 5, receives various types of data and instructions from an administrator terminal or the like, and transmits each learned model to the recognition device 50.

The storage unit 12 is a storage device that stores data, programs to be executed by the control unit 20, and the like, and is, for example, a memory or a processor. The storage unit 12 stores a distance image 13, a skeleton definition 14, skeleton data 15, frame information 16, an element recognition model 17, and a transition portion evaluation model 18.

Figure 3:
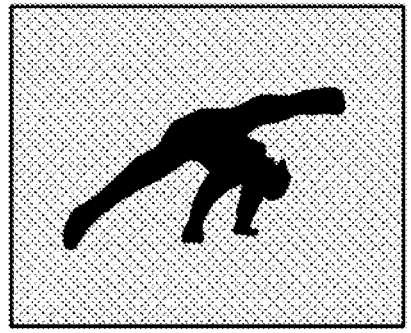
FIG. 3 is a diagram for describing a distance image.

The distance image 13 is a distance image of the performer 1 captured by the 3D laser sensor 5. FIG. 3 is a diagram for describing the distance image. As illustrated in FIG. 3, the distance image 13 is data including a distance from the 3D laser sensor 5 to a pixel, and the closer the distance from the 3D laser sensor 5, the darker the color is displayed.

The skeleton definition 14 is definition information for specifying each joint on a skeleton model. The definition information stored here may also be measured for each performer by 3D sensing with the 3D laser sensor, or may also be defined by using a skeleton model of a general system.

Figure 4:
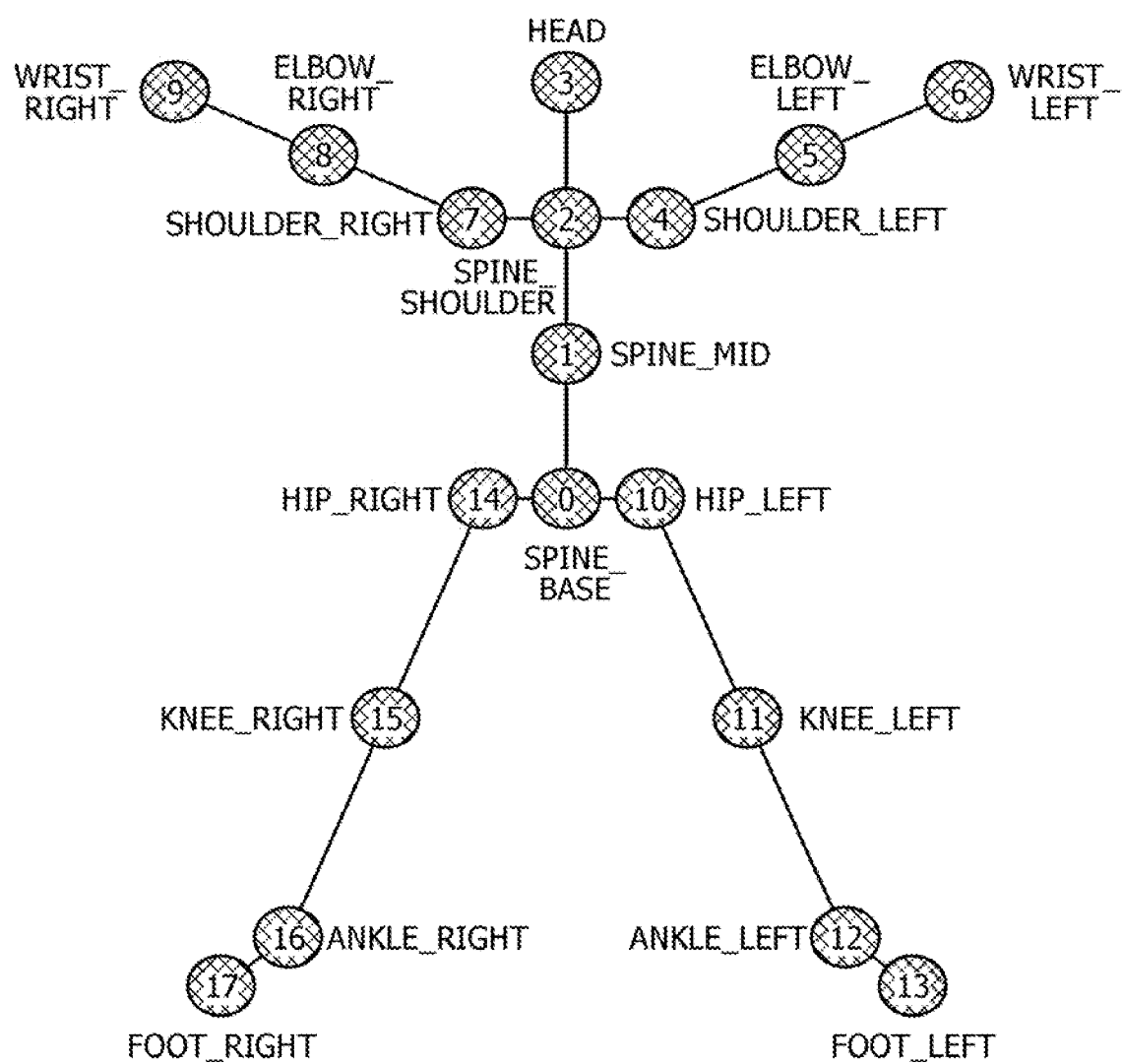
FIG. 4 is a diagram for describing a skeleton definition.

FIG. 4 is a diagram for describing the skeleton definition 14. As illustrated in FIG. 4, the skeleton definition 14 stores 18 pieces of (numbers 0 to 17) definition information in which each joint specified by a known skeleton model is numbered. For example, as illustrated in FIG. 4, a right shoulder joint (SHOULDER_RIGHT) is assigned with number 7, a left elbow joint (ELBOW_LEFT) is assigned with number 5, a left knee joint (KNEE_LEFT) is assigned with number 11, and a right hip joint (HIP_RIGHT) is assigned with number 14. Here, in the embodiment, an X coordinate of the right shoulder joint of number 7 may be described as X7, a Y coordinate as Y7, and a Z coordinate as Z7. Note that, for example, a Z axis may be defined as a distance direction from the 3D laser sensor 5 toward a subject, a Y axis may be defined as a height direction perpendicular to the Z axis, and an X axis may be defined as a horizontal direction.

The skeleton data 15 is data including information regarding a skeleton, which is generated by using each distance image. Specifically, the skeleton data 15 includes a position of each joint, which is defined in the skeleton definition 14 and is acquired by using a distance image. FIG. 5 is a diagram for describing the skeleton data 15. As illustrated in FIG. 5, the skeleton data 15 is information in which "frame, image information, and skeleton information" are associated.

Here, the "frame" is an identifier that identifies each frame captured by the 3D laser sensor 5, and the "image information" is data of a distance image in which positions of joints and the like are known. The "skeleton information" is three-dimensional position information of a skeleton, and is the joint positions (three-dimensional coordinates) corresponding to the 18 joints illustrated in FIG. 4. The example of FIG. 5 illustrates that the positions of the 18 joints including coordinates "X3, Y3, Z3" of HEAD are known in "image data A1" that is the distance image. Note that the joint positions may also be extracted by using, for example, a learning model which has been learned in advance and which extracts each joint position from a distance image.

The frame information 16 is information used for learning of the transition portion evaluation model, which will be described later, or the like, and is frame information regarding a distance image captured during a performance of a certain performer. FIG. 6 is a diagram for describing the frame information 16. As illustrated in FIG. 6, the frame information 16 is information in which "element, motion, start, and end" are associated.

The "element" is information indicating a type of an element performed. The "motion" is information indicating whether or not a motion is performed, and "element" is set in a case where the motion corresponds to an element, "combination" is set in a case where the motion is a transition portion corresponding to a combination, and "none" is set in a case where the motion is a transition portion not corresponding to a combination. The "start and end" indicate a start frame and an end frame of the motion. In the example of FIG. 6, it is indicated that a frame 727 to a frame 741 corresponding to "combination" are used as teacher data including a combination (label "1"), and it is indicated that a frame 57 to a frame 186 corresponding to "none" are used as teacher data including no combination (label "0").

The element recognition model 17 is a learning model that recognizes whether or not an element is performed on the basis of edge data generated from skeleton information in time series, and is a model that uses a neural network or the like learned by an element recognition learning unit 30 described later.

The transition portion evaluation model 18 is a learning model that evaluates a transition portion on the basis of edge data generated from skeleton information in time series, and is a model that uses a neural network or the like learned by an evaluation learning unit 40 described later. The transition portion evaluation model 18 is learned to evaluate, as a combination, a transition period that does not correspond to "stop between elements, extra step between elements, contact of a foot with a beam between elements, loss of balance between elements, apparent stretch of a leg or hip in a first element before takeoff of a second element, or an extra arm swing".

The control unit 20 is a processing unit that controls the entire learning device 10, and is, for example, a processor. The control unit 20 includes the element recognition learning unit 30 and the evaluation learning unit 40, and executes learning of the element recognition model 17 and the transition portion evaluation model 18. Note that the element recognition learning unit 30 and the evaluation learning unit 40 are examples of an electronic circuit of a processor or the like, or examples of a process included in a processor or the like.

The element recognition learning unit 30 is a processing unit that includes a preprocessing unit 31, a learning data generation unit 32, and a learning unit 33, executes learning of the element recognition model 17, and generates the element recognition model 17.

The preprocessing unit 31 is a processing unit that calculates edge data from skeleton information of the 18 joints in order to execute learning of the element recognition model 17. For example, the preprocessing unit 31 refers to the frame information 16 to specify a start frame and an end frame of "motion=element" corresponding to an element. At this time, the preprocessing unit 31 acquires an element name preset by an administrator or the like for the corresponding "element". Subsequently, the preprocessing unit 31 determines a predetermined number (for example, 60) of cutout portions with a random number so as to include an interval between the specified frames, and acquires the skeleton data 15 corresponding to each determined frame. Note that, in a case where 60 or more frames are included in the interval between frames, the preprocessing unit 31 acquires 60 frames from the interval between the corresponding frames. Thereafter, the preprocessing unit 31 calculates edge data from the skeleton data 15 corresponding to each acquired frame.

Specifically, the preprocessing unit 31 reads skeleton information from each skeleton data 15 of each of the 60 frames. Then, the preprocessing unit 31 calculates, for each of the 18 joints, edge data, which is data representing an orientation of connected skeletons (between joints) by using each skeleton information and Equation (1). Thereafter, the preprocessing unit 31 outputs the edge data corresponding to each joint to the learning data generation unit 32.

[Equation 1]

$$\hat{e}_{i,x} = \frac{e_{i,x}}{|e_i|}, \hat{e}_{i,y} = \frac{e_{i,y}}{|e_i|}, \hat{e}_{i,z} = \frac{e_{i,z}}{|e_i|}, \left(|e_i| = \sqrt{e_{i,x}^2 + e_{i,y}^2 + e_{i,z}^2}\right) \quad \text{Equation 1}$$

In this way, according to Equation (1), the preprocessing unit 31 generates one edge data for each of the 18 joints by combining each edge data calculated from the skeleton information of the 60 frames. Note that, in Equation (1), x, y, and z indicate coordinates, i indicates the number of joints, $e_{i,x}$ indicates a size of an i-th joint in an x-axis direction, $e_{i,y}$ indicates a size of the i-th joint in a y-axis direction, and $e_{i,z}$ indicates a size of the i-th joint in a z-axis direction.

The learning data generation unit 32 is a processing unit that generates learning data used for learning of the element recognition model 17 by using edge data generated by using skeleton information in time series. For example, the learning data generation unit 32 acquires, from the preprocessing unit 31, edge data of each joint corresponding to a section (motion portion) corresponding to an element and a name of the corresponding element. Then, the learning data generation unit 32 generates learning data in which the edge data of each joint and the name of the element are associated with each other. Thereafter, the learning data generation unit 32 stores the learning data in the storage unit 12, and outputs the learning data to the learning unit 33.

The learning unit 33 is a processing unit that executes learning of the element recognition model 17. Specifically, the learning unit 33 learns a neural network used in the element recognition model 17 by using each edge data of learning data as an explanatory variable and an element name of the learning data as an objective variable (label). In other words, the learning unit 33 learns the element recognition model 17 that recognizes an element by using change in the edge data of each joint in time series as a feature amount.

For example, the learning unit 33 inputs, as one input data, edge data of each joint acquired from a predetermined motion section into the element recognition model 17, and acquires a degree of matching (likelihood) of each element assumed in advance from the element recognition model 17.

Then, the learning unit 33 learns each parameter of the neural network by an error back propagation method based on an error between an output result and a label so that a likelihood of an element name of the label, which is correct answer information, is the largest among likelihoods of each element included in the output result.

In this way, the learning unit 33 executes learning of the element recognition model 17 by using each learning data, and when the learning is completed, stores the learned element recognition model 17 in the storage unit 12. Note that a timing to end the learning may be optionally set, such as a time point at which the learning using equal to or more than a predetermined number of pieces of learning data is completed, or a time point at which a restoration error becomes less than a threshold.

Returning to FIG. 2, the evaluation learning unit 40 is a processing unit that includes a section determination unit 41, a preprocessing unit 42, a learning data generation unit 43, and a learning unit 44, and executes learning of the transition portion evaluation model 18.

The section determination unit 41 is a processing unit that determines a section to be used as learning data of the transition portion evaluation model 18 from the frame information 16. Specifically, the section determination unit 41 determines a section corresponding to "motion=combination" as a cutout section in a case where learning data including a combination is generated, and determines a section corresponding to "motion=none" or "motion=element" as a cutout section in a case where learning data including no combination is generated. Then, the section determination unit 41 outputs each determined cutout section to the preprocessing unit 42 or the like.

The preprocessing unit 42 is a processing unit that calculates edge data from skeleton information of the 18 joints in order to execute learning of the transition portion evaluation model 18. Specifically, the preprocessing unit 42 determines a predetermined number (for example, 60) of portions to be cut out with a random number from frames of a section determined by the section determination unit 41, and acquires the skeleton data 15 corresponding the determined frame. Thereafter, the preprocessing unit 42 calculates edge data corresponding to each of the 18 joints from each skeleton data 15 by using Equation (1), and outputs a calculation result to the learning data generation unit 43.

For example, the preprocessing unit 42 refers to the frame information 16 to specify an interval between frames including the start frame 727 and the end frame 741 of the "motion=combination" determined as the cutout section. Subsequently, since the interval between frames is less than 60 frames, the preprocessing unit 42 determines a frame 704 to a frame 763 as the cutout section so as to include the start frame 727 to the end frame 741. Then, the preprocessing unit 42 calculates the edge data for each of the 18 joints by using each skeleton data 15 corresponding to the frame 704 to the frame 763.

The learning data generation unit 43 is a processing unit that generates learning data used for learning of the transition portion evaluation model 18 by using edge data generated by using skeleton information in time series. Specifically, for each of the 18 joints, the learning data generation unit 43 generates edge data (pre-cutout edge data) corresponding to a predetermined section input from the preprocessing unit 42 and data (post-cutout edge data) obtained by excluding edge data corresponding to an element portion from the edge data. Then, the learning data generation unit 43 generates learning data in which the pre-cutout edge data for each of the 18 joints, the post-cutout edge data for each of the 18 joints, and a label (correct answer information) are associated with each other.

Figure 7:
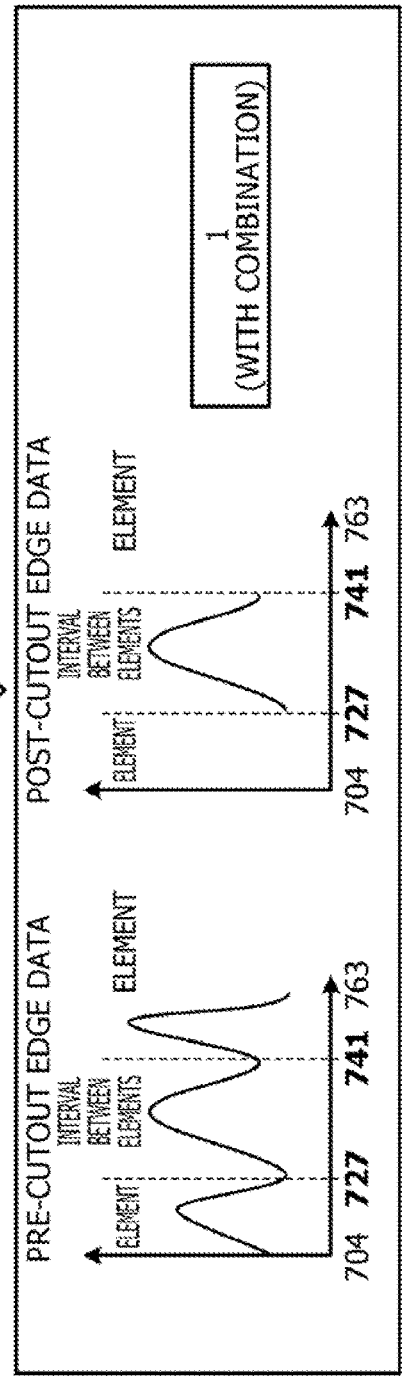
FIG. 7 is a diagram for describing generation of learning data.

FIG. 7 is a diagram for describing generation of the learning data. In FIG. 7, in order to simplify description, one joint will be used for description. As illustrated in FIG. 7, the preprocessing unit 42 calculates edge data from the frame 704 to the frame 763 including the start frame 727 to the end frame 741 of the "motion=combination" corresponding to a combination portion. Then, the learning data generation unit 43 sets the edge data corresponding to the frame 704 to the frame 763 as pre-cutout edge data. Furthermore, the learning data generation unit 43 generates post-cutout edge data obtained by excluding an element portion from the frame 704 to the frame 763, and cutting out the frame 727 to the frame 741 of a transition portion. Then, the learning data generation unit 43 generates learning data in which the pre-cutout edge data, the post-cutout edge data, and a label (1) are associated with each other.

Here, the learning data generation unit 43 generates learning data including a combination (label=1) by using the edge data of the frames of the transition portion corresponding to the "motion=combination", and generates learning data including no combination (label=0) by using the edge data of the frames of the transition portion corresponding to the "motion=none" or the "motion=element".

Figure 8:
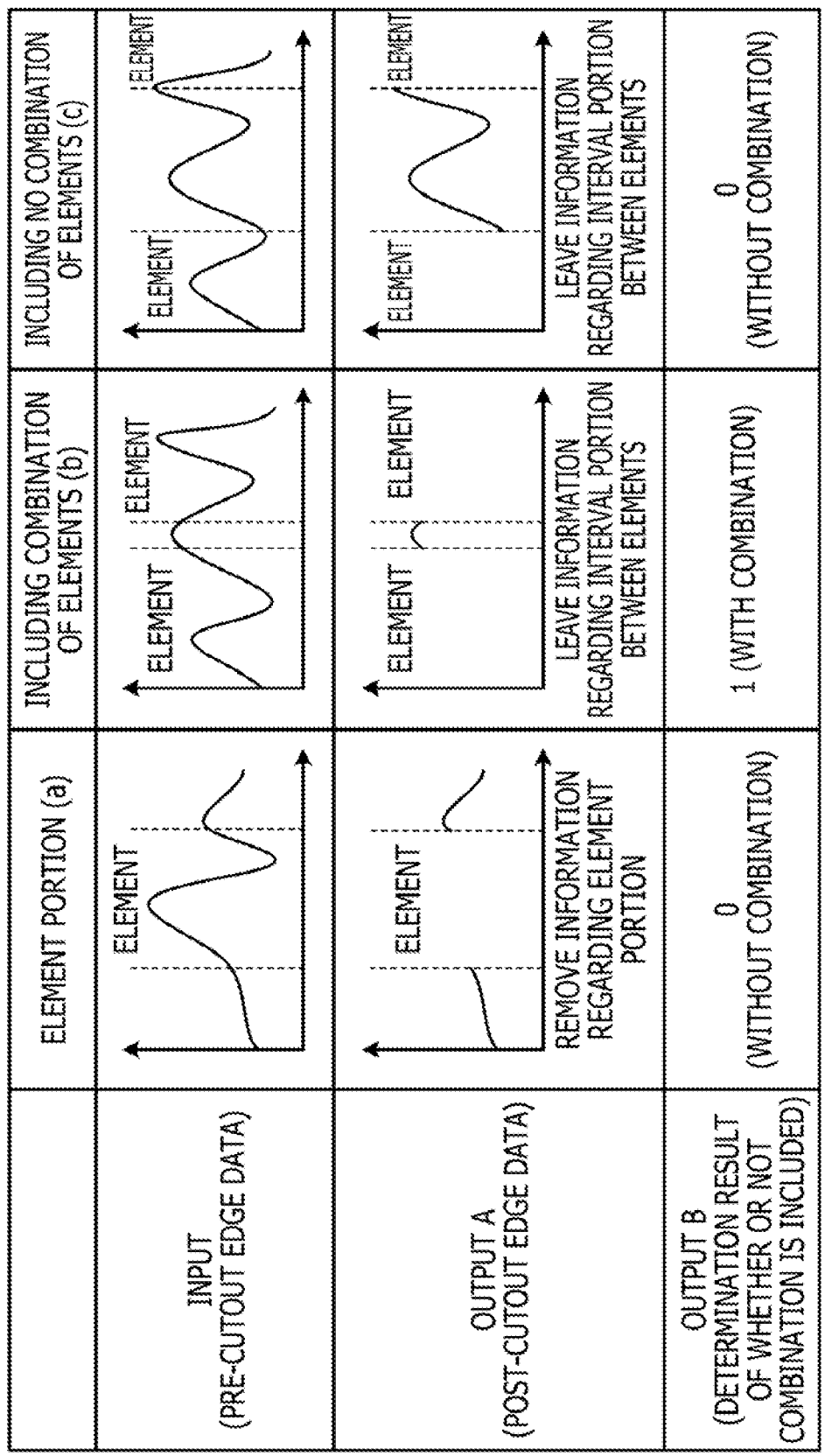
FIG. 8 is a diagram for describing the learning data.

FIG. 8 is a diagram for describing the learning data. As illustrated in FIG. 8, the learning data generation unit 43 generates the learning data including input data serving as an explanatory variable and output data serving as an objective variable for the respective sections of an element portion (a), including a combination of elements (b), and including no combination of elements (c). Note that, in FIG. 8, for simplification of the description, only one joint is illustrated, but in reality, edge data of the 18 joints are associated with each other.

For example, for the element portion (a), pre-cutout edge data including the element portion as input data, post-cutout edge data obtained by removing the element portion of the input data as output data A, and learning data including no combination (label=0) as output data B are generated.

Furthermore, for the portion including a combination of elements (b), pre-cutout edge data including an element portion and a combination as input data, post-cutout edge data obtained by removing the element portion of the input data as output data A, and learning data including a combination (label=1) as output data B are generated.

Furthermore, for the portion including no combination of elements (c), pre-cutout edge data including an element portion and a transition portion that is not a combination as input data, post-cutout edge data obtained by removing the element portion of the input data as output data A, and learning data including no combination (label=0) as output data B are generated.

The learning unit 44 is a processing unit that executes learning of the transition portion evaluation model 18. Specifically, the learning unit 44 learns a neural network used in the transition portion evaluation model 18 by using pre-cutout edge data (for the 18 joints) of learning data as an explanatory variable, post-cutout edge data (for the 18 joints) of learning data or a determination result of whether or not a combination is included as an objective variable.

Here, the transition portion evaluation model 18 includes a model A that cuts out a transition portion and a model B that evaluates the transition portion, and each model is configured by using an autoencoder. In other words, the learning unit 44 learns the transition portion evaluation model 18 including the model A that extracts a transition portion by using change in edge data of each joint in time series as a feature amount, and the model B that evaluates the transition portion by using change in the transition portion in time series as a feature amount.

Figure 9:
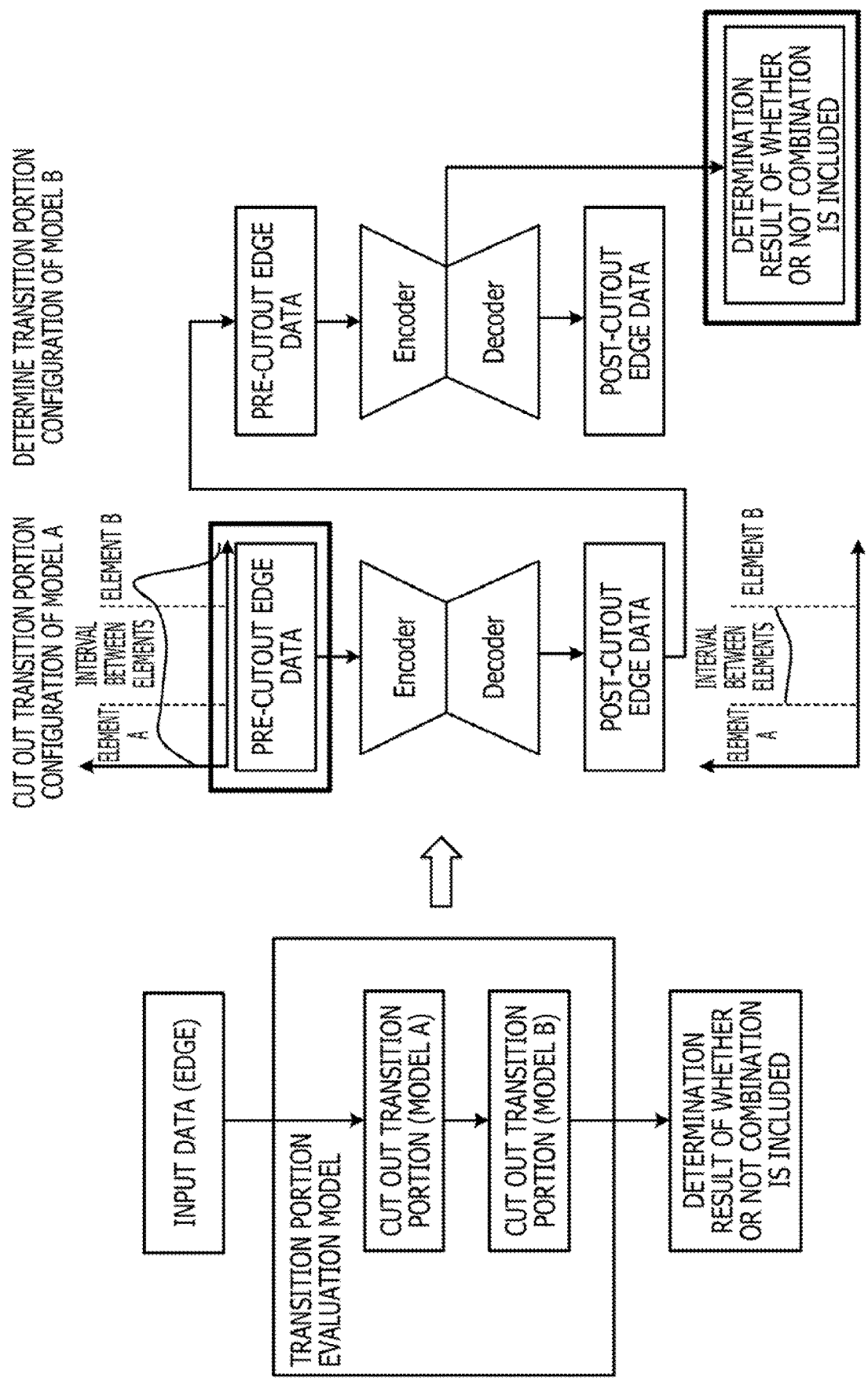
FIG. 9 is a diagram for describing learning of a transition portion evaluation model.

FIG. 9 is a diagram for describing learning of the transition portion evaluation model 18. As illustrated in FIG. 9, when the learning unit 44 inputs input data (edge data) including "an element A, an interval between elements, and an element B" into the model A, the model A outputs edge data of the interval between elements obtained by excluding the element portions. Then, the learning unit 44 learns the model A on the basis of a difference between the output of the model A and post-cutout edge data included in learning data.

Furthermore, when the learning unit 44 inputs the output of the model A into the model B, the model B restores the edge data of the interval between elements input into the model A. At this time, the learning unit 44 acquires a determination result of whether or not a combination is included from the model B (for example, an output of an encoder), and executes learning of the model B on the basis of a difference between the acquired determination result of whether or not a combination is included and correct answer information (label) included in the learning data.

The flow of FIG. 9 described above will be specifically described by using the learning data including a combination illustrated in (b) of FIG. 8. The learning unit 44 inputs input data (pre-cutout edge data) including an element, an interval between elements, and an element into the model A, and acquires an output result in which a transition portion is cut out by the model A. Then, the learning unit 44 learns the model A by using the error back propagation method or the like so that an error between the output result of the model A and the output data A in the learning data is minimized.

Thereafter, the learning unit 44 inputs the output result of the model A into the model B, and acquires a determination result of whether or not a combination is included from the model B. Then, the learning unit 44 learns the model B by using the error back propagation method or the like so that an error between the determination result of whether or not a combination is included acquired from the model B and the output data B in the learning data is minimized.

In this way, the learning unit 44 executes learning of the transition portion evaluation model 18 including the model A and the model B by using each learning data, and when the learning is completed, stores the learned transition portion evaluation model 18 in the storage unit 12. Note that a timing to end the learning may be optionally set, such as a time point at which the learning using equal to or more than a predetermined number of pieces of learning data is completed, or a time point at which a restoration error becomes less than a threshold.

(Configuration of Recognition Device 50)

Figure 10:
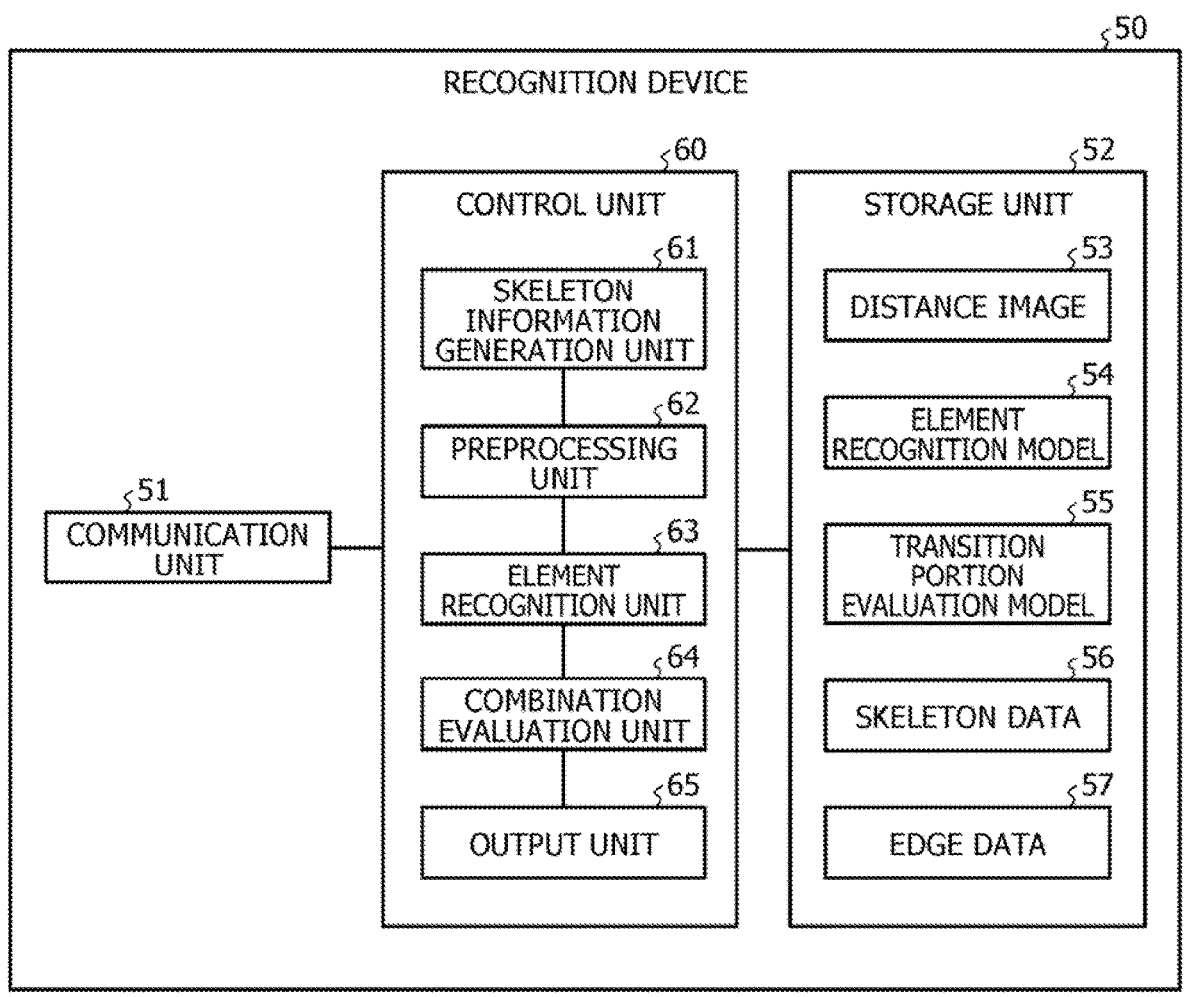
FIG. 10 is a functional block diagram illustrating a functional configuration of a recognition device according to the first embodiment.

FIG. 10 is a functional block diagram illustrating a functional configuration of the recognition device 50 according to the first embodiment. As illustrated in FIG. 10, the recognition device 50 includes a communication unit 51, a storage unit 52, and a control unit 60.

The communication unit 51 is a processing unit that controls communication with another device, and is, for example, a communication interface. For example, the communication unit 51 receives a distance image of the performer 1 captured by the 3D laser sensor 5, acquires various learned models from the learning device 10, and transmits a recognition result to a scoring device.

The storage unit 52 is a storage device that stores data, programs to be executed by the control unit 60, and the like, and is, for example, a memory or a processor. The storage unit 52 stores a distance image 53, an element recognition model 54, a transition portion evaluation model 55, skeleton data 56, and edge data 57. The distance image 53 is a distance image of the performer 1 captured by the 3D laser sensor 5, and is, for example, a distance image obtained by capturing a performance of the performer to be scored. Note that the distance image 53 is captured at any time during the performance of the performer 1.

The element recognition model 54 is a learned element recognition model acquired from the learning device 10. This element recognition model 54 outputs a probability (likelihood) of correspondence to each element specified in advance when edge data of the 18 joints corresponding to a certain section is input as input data.

The transition portion evaluation model 55 is a learned transition portion evaluation model acquired from the learning device 10. This transition portion evaluation model 55 outputs a probability (likelihood) of correspondence to a combination of elements when edge data of the 18 joints corresponding to a certain section is input as input data.

The skeleton data 56 is data including information regarding a skeleton, which is generated by using each distance image. Specifically, the skeleton data 56 is a position of each joint, which is defined in the skeleton definition 14 and is acquired by using a distance image. Note that, since the skeleton data 56 is information similar to the skeleton data 15 illustrated in FIG. 5, detailed description thereof will be omitted.

The edge data 57 is edge data of each of the 18 joints, which is calculated by using skeleton information of the skeleton data 56. For example, the edge data 57 is data representing an orientation of connected skeletons (between joints).

The control unit 60 is a processing unit that controls the entire recognition device 50, and is, for example, a processor. The control unit 60 includes a skeleton information generation unit 61, a preprocessing unit 62, an element recognition unit 63, a combination evaluation unit 64, and an output unit 65, and executes recognition of an element and combination determination between elements. Note that the skeleton information generation unit 61, the preprocessing unit 62, the element recognition unit 63, the combination evaluation unit 64, and the output unit 65 are examples of an electronic circuit of a processor or the like, or examples of a process included in a processor or the like.

The skeleton information generation unit 61 is a processing unit that generates skeleton information including the positions of the 18 joints from each distance image captured by the 3D laser sensor 5. For example, the skeleton information generation unit 61 executes background differentiation, noise correction, and the like on a distance image to generate 3D point cloud data. Furthermore, the skeleton information generation unit 61 generates skeleton information of low accuracy that specifies positions of 16 joints from the 3D point cloud data. Then, the skeleton information generation unit 61 executes fitting of a skeleton and a point cloud by using the skeleton information of low accuracy and the 3D point cloud data, and generates skeleton information of high accuracy. Thereafter, the skeleton information generation unit 61 stores the skeleton data 56 in which a number of a frame corresponding to the distance image, the distance image, and the skeleton information are associated with each other in the storage unit 52.

Note that a learned model that recognizes the skeleton information from the distance image or the 3D point cloud data may also be used to generate the skeleton information of low accuracy. Furthermore, the skeleton information in the skeleton data 15 in the learning device 10 may also be generated by a similar method.

The preprocessing unit 62 is a processing unit that generates edge data from each skeleton information. Specifically, the preprocessing unit 62 executes generation of each edge data of the 18 joints as preprocessing of element recognition processing or combination determination processing using each model. For example, as in the learning device 10, the preprocessing unit 62 calculates the edge data 57 of each joint by using Equation (1) and the skeleton information of each skeleton data 56. Then, the preprocessing unit 62 stores a frame and the edge data 57 of each joint in association with each other in the storage unit 52.

The element recognition unit 63 is a processing unit that executes recognition of an element by using edge data of the performer 1 acquired in time series and the element recognition model 54. Specifically, the element recognition unit 63 inputs the edge data 57 of the 18 joints corresponding to a frame of a certain section into the element recognition model 54 as one input data, and acquires a likelihood of each element as an output result of the element recognition model 54. Then, the element recognition unit 63 sets, as an element recognition result, an element corresponding to the highest likelihood among the likelihoods included in the output result. At this time, in a case where any of the likelihoods corresponding to each element is less than a threshold, it may be determined that there is no corresponding element.

For example, the element recognition unit 63 inputs each edge data generated by using a frame 1 to a frame 60 into the element recognition model 54, and determines whether or not an element is performed on the basis of an output result of the element recognition model 54. Subsequently, the element recognition unit 63 inputs each edge data generated by using a frame 2 to a frame 61 into the element recognition model 54, and determines whether or not an element is performed on the basis of an output result of the element recognition model 54. Further subsequently, the element recognition unit 63 inputs each edge data generated by using a frame 3 to a frame 63 into the element recognition model 54, and determines whether or not an element is performed on the basis of an output result of the element recognition model 54.

In this way, the element recognition unit 63 repeatedly executes the recognition of an element of the performer 1 by using the edge data based on the distance image obtained by capturing each performance of the performer 1, and outputs a recognition result to the combination evaluation unit 64 and the output unit 65 and stores the recognition result in the storage unit 52.

The combination evaluation unit 64 is a processing unit that executes evaluation of a transition portion by using edge data of the performer 1 acquired in time series and the transition portion evaluation model 55. For example, the combination evaluation unit 64 inputs each edge data of the 18 joints as one input data into a model A of the transition portion evaluation model 55, and generates edge data corresponding to a transition portion obtained by removing an element portion. Subsequently, the combination evaluation unit 64 inputs the edge data corresponding to the transition portion, which is an output result of the model A, into a model B, and acquires a probability (likelihood) of correspondence to a combination. Then, the combination evaluation unit 64 outputs the likelihood as a combination determination result (evaluation result) to the output unit 65 or stores the likelihood in the storage unit 52.

Note that, as in the element recognition unit 63, the combination evaluation unit 64 also shifts frames one by one to change input data, and repeats evaluation of a combination. Furthermore, a determination result of whether or not a combination is included is output with a likelihood of approximately 0 (including no combination) to 1 (including a combination). Thus, whether or not a combination is included may also be output with 0.5 as a threshold, and in a case where the value is close to 0.5 (for example, 0.4 to 0.6), it is also possible to consider that evaluation is impossible.

Returning to FIG. 10, the output unit 65 is a processing unit that outputs a recognition result of an element and a determination result of a combination. For example, the output unit 65 outputs a recognition result of an element acquired from the element recognition unit 63 and an evaluation result of a combination acquired from the combination evaluation unit 64 to the scoring device 90, and outputs them to a display unit such as a display. Note that the output unit 65 may also output a frame number used for determining an element together with the recognition result of the element, and a frame number used for evaluating a combination together with the evaluation result of the combination.

(Configuration of Scoring Device 90)

Figure 11:
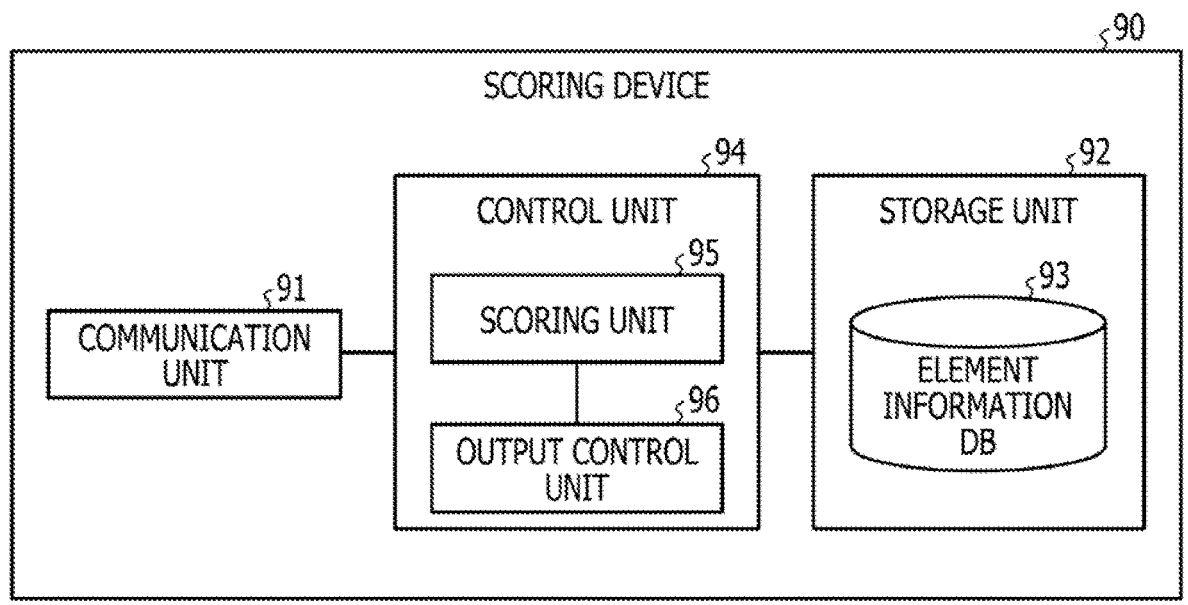
FIG. 11 is a functional block diagram illustrating a functional configuration of a scoring device according to the first embodiment.

FIG. 11 is a functional block diagram illustrating a functional configuration of the scoring device 90 according to the first embodiment. As illustrated in FIG. 11, the scoring device 90 includes a communication unit 91, a storage unit 92, and a control unit 94. The communication unit 91 receives, from the recognition device 50, a recognition result of an element, an evaluation result of a combination of elements, skeleton information (three-dimensional skeleton position information) of a performer, and the like.

The storage unit 92 is an example of a storage device that stores data and a program to be executed by the control unit 94, and the like, and is, for example, a memory or a hard disk. The storage unit 92 stores element information 93. The element information 93 is information in which a name of an element, a difficulty level, a score, a position of each joint, an angle of a joint, a scoring rule, and the like are associated with each other. Furthermore, the element information 93 also includes combination scoring information in which a combination of elements and a score are associated with each other.

The control unit 94 is a processing unit that controls the entire scoring device 90, and is, for example, a processor. The control unit 94 includes a scoring unit 95 and an output control unit 96, and performs scoring of the performer, or the like according to information input into the recognition device 50.

The scoring unit 95 is a processing unit that executes scoring of an element of the performer or scoring of a performance of the performer. Specifically, the scoring unit 95 compares a recognition result of an element and an evaluation result of a combination transmitted from the recognition device 50 at any time with the element information 93, and executes scoring of the element and the performance performed by the performer 1. Then, the scoring unit 95 outputs a scoring result to the output control unit 96.

The output control unit 96 is a processing unit that displays a scoring result of the scoring unit 95, and the like on the display and the like. For example, the output control unit 96 acquires, from the recognition device 50, various types of information such as a performance image, a distance image captured by each 3D laser sensor, three-dimensional skeleton information generated by the recognition device 50, each image data during a performance of the performer 1, and a scoring result, and displays the various types of information on a predetermined screen.

Figure 12:
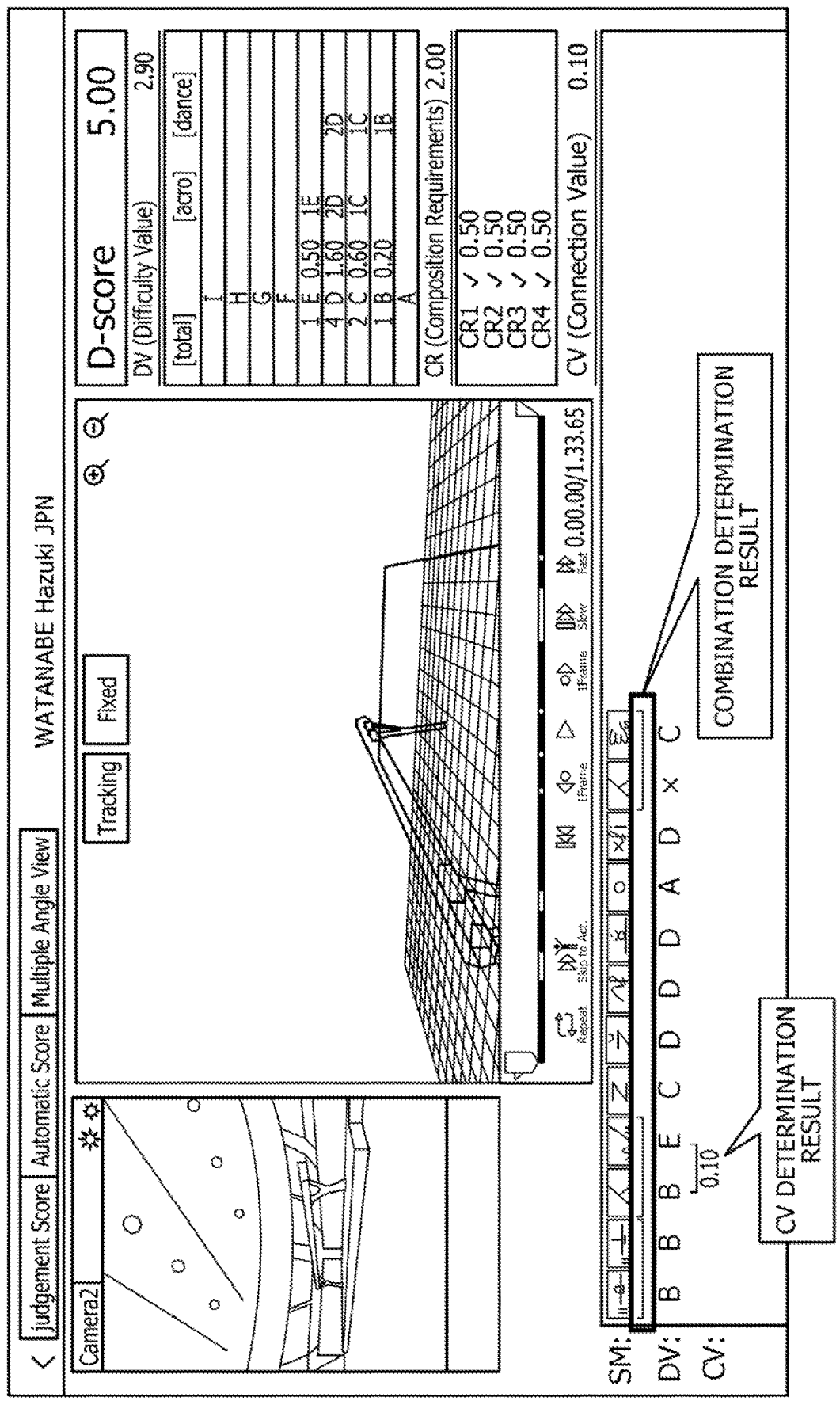
FIG. 12 is a diagram illustrating an example of a scoring image.

FIG. 12 is a diagram illustrating an example of a scoring image. As illustrated in FIG. 12, in the scoring image, an image of the performer 1, 3D image data during a performance of the performer 1, a D score, a symbol mark (SM) indicating the performed element, a difficulty value (DV) indicating a difficulty level of the performed element, an element group (EG) indicating a group of the performed element, and the like are displayed. Furthermore, an interval between elements corresponding to a combination is displayed under each element of the SM.

[Flow of Processing]

Next, a flow of processing by each of the devices described above will be described. Note that, as for the element recognition processing, since the processing may be adopted by a known learning model or on a rule base, detailed description thereof will be omitted.

(Learning of Transition Portion Evaluation Model)

Figure 13:
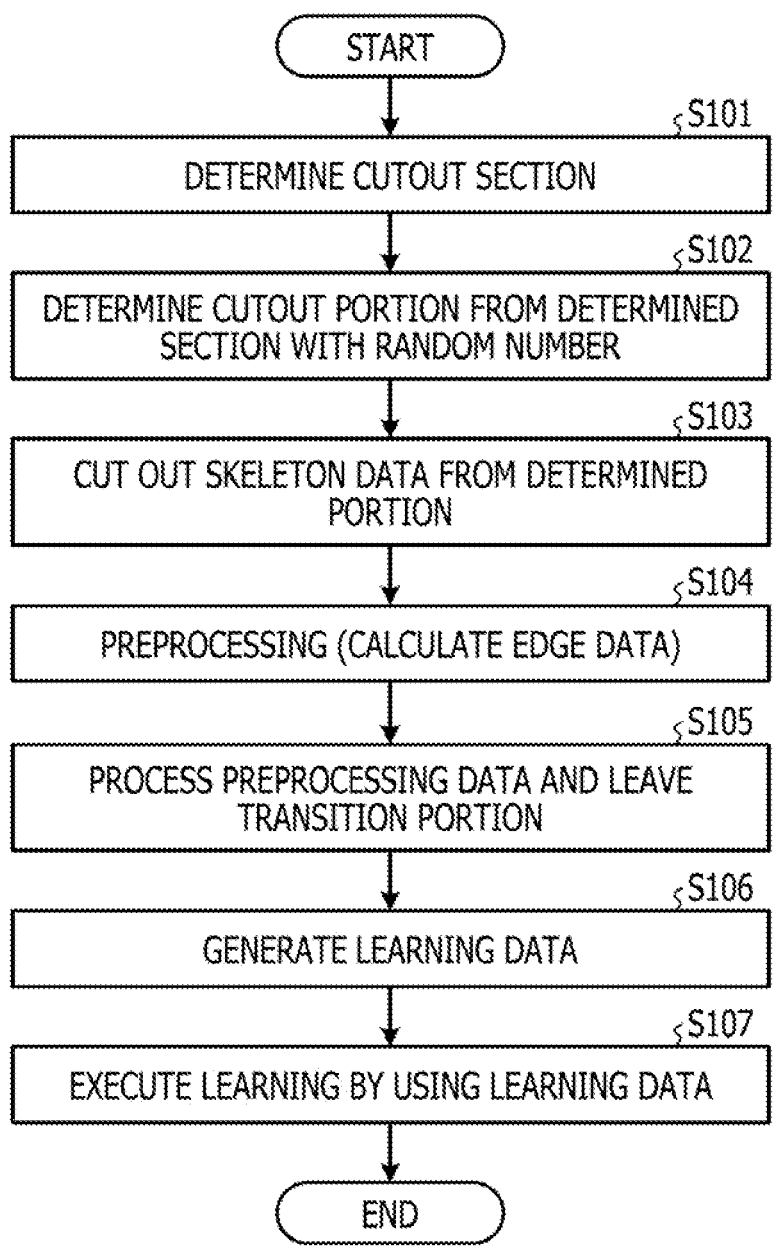
FIG. 13 is a flowchart illustrating a flow of the learning of the transition portion evaluation model.

FIG. 13 is a flowchart illustrating a flow of learning of the transition portion evaluation model. As illustrated in FIG. 13, the evaluation learning unit 40 of the learning device 10 determines which section of the frame information 16 is cut out as learning data (S101).

Subsequently, the evaluation learning unit 40 determines a cutout portion from the determined section with a random number (S102), and cuts out skeleton data from the determined portion (S103). Then, the evaluation learning unit 40 executes preprocessing for each skeleton data and calculates edge data for the 18 joints (S104).

Thereafter, the evaluation learning unit 40 generates each edge data of a transition portion (interval between elements) obtained by excluding element portions (motion portions) from each edge data obtained in the preprocessing (S105), and generates learning data (S106). Then, the evaluation learning unit 40 executes learning of the transition portion evaluation model 18 by using the learning data (S107).

(Flow of Recognition Processing)

Figure 14:
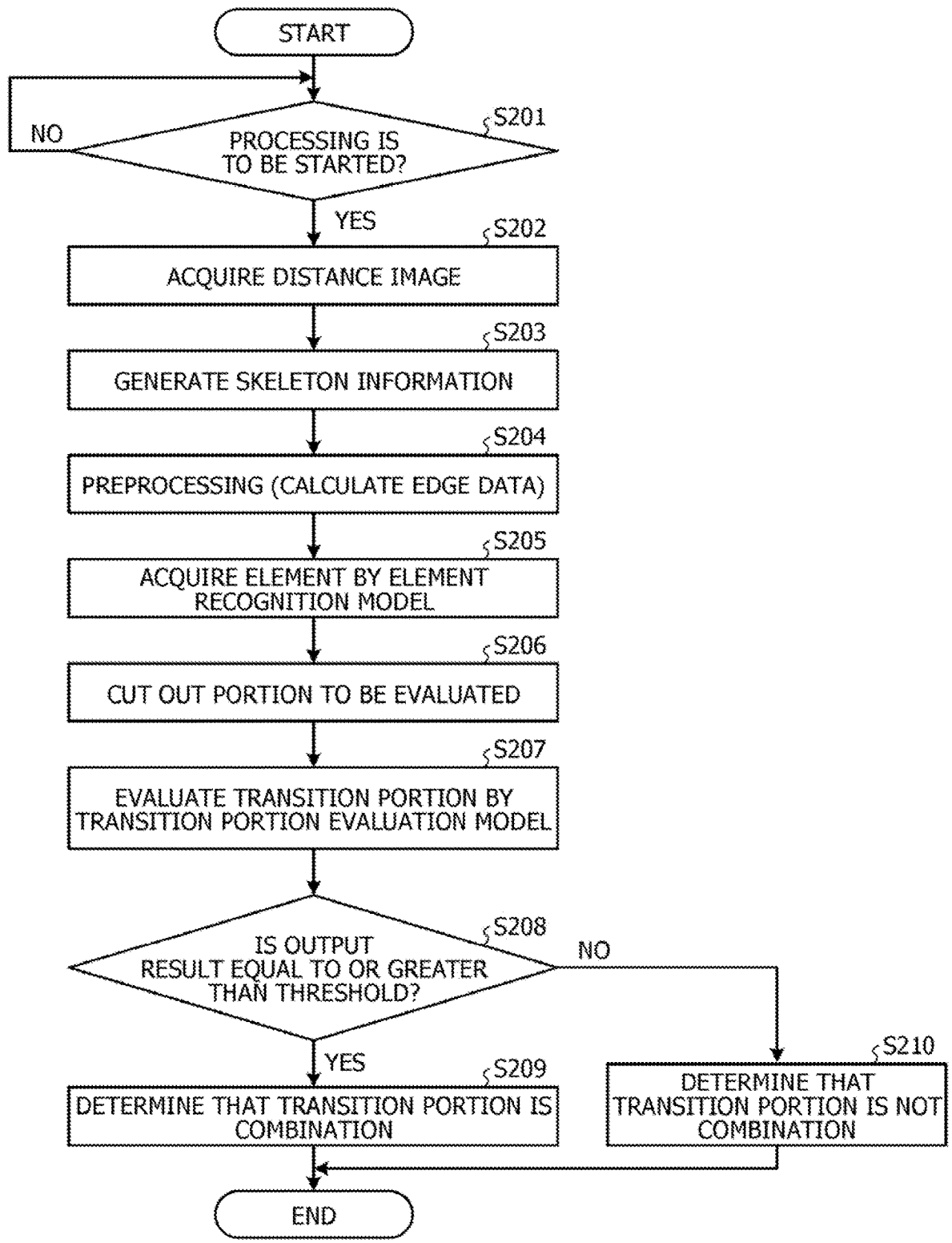
FIG. 14 is a flowchart illustrating a flow of recognition processing.

FIG. 14 is a flowchart illustrating a flow of recognition processing. As illustrated in FIG. 14, when start of the processing is instructed (S201: Yes), the recognition device 50 acquires a distance image (S202) and generates skeleton information (S203).

Subsequently, the recognition device 50 generates edge data for the 18 joints from the skeleton information (S204), inputs each edge data into the element recognition model 54, and acquires a result of recognition of an element (S205).

Subsequently, the recognition device 50 cuts out an evaluation portion from an acquired frame (S206), inputs edge data for the 18 joints corresponding to the cutout portion into the transition portion evaluation model 18, and evaluates a transition portion (S207).

Here, in a case where an output result has a likelihood equal to or greater than a threshold (S208: Yes), the recognition device 50 determines that the corresponding transition portion is a combination (S209), and in a case where the output result does not have a likelihood equal to or greater than the threshold (S208: No), determines that the corresponding transition portion is not a combination (S210).

Note that, here, although an example of executing evaluation of a combination after recognition of an element has been described, the present invention is not limited thereto, and the order may also be reversed, or the recognition of an element and the evaluation of a combination may be executed in separate flows.

[Effects]

As described above, the learning device 10 calculates edge data from skeleton data in time series and prepares the model A that outputs data of a transition portion from the edge data. The learning device 10 prepares the model B that outputs an evaluation result of the transition portion from the data output from the model A. Then, the learning device 10 inputs the edge data to the transition portion evaluation model 55 in which the model A and the model B are connected, and performs learning by using the data of the transition portion and the evaluation result as an output. Thereafter, the recognition device 50 uses the transition portion evaluation model 55 to determine whether or not a combination is included by using the edge data as an input.

Specifically, the recognition device 50 acquires, in time series, skeleton information based on position information of joints of an object that executes a plurality of motions. The recognition device 50 specifies, on the basis of the skeleton information in time series, a transition period between a first motion and a second motion that follows the first motion, which are included in the plurality of motions. Then, the recognition device 50 may evaluate the transition period by using skeleton information corresponding to the specified transition period as an input. As a result, the recognition device 50 may evaluate a transition portion between motions.

Furthermore, since automatic recognition using deep learning may be implemented without generating a rule base for evaluating the transition portion, a load on a grader or the like may also be reduced compared to a case where scoring is manually performed.

Furthermore, since the transition portion may be accurately evaluated, a connection value (CV) and a series bonus (SB) in gymnastics competitions and the like may be accurately assigned. Furthermore, even in a case where an element evolves, a scoring rule changes, or the like, it is possible to follow these by re-learning of the element recognition model 17 and the transition portion evaluation model 18, so that reliability and versatility of the automatic scoring system may be improved.

Here, verification data of combination determination will be described. FIG. 15 is a diagram illustrating an example of verification in which it is determined that a combination is included, and FIG. 16 is a diagram illustrating an example of verification in which it is determined that a combination is not included. In FIGS. 15 and 16, input data input into the model A of the transition portion evaluation model and output data output by the model A of the transition portion evaluation model are displayed for a certain joint. Furthermore, a horizontal axis of each graph is the number of frames, and a vertical axis is a value obtained by normalizing coordinates. Note that, in reality, there are input data and output data for the 18 joints, but for the sake of clarity of description, one joint is exemplified.

As illustrated in FIG. 15, when input data in which change in an x axis is small and a y axis and a z axis change periodically is input into the transition portion evaluation model 55, a likelihood becomes close to 1.0 around a frame 30. In other words, it may be seen that there is a transition portion including a combination around the frame 30. On the other hand, as illustrated in FIG. 16, when input data in which an x axis, a y axis, and a z axis change non-periodically is input into the transition portion evaluation model 55, a portion where a likelihood becomes close to 1.0 occurs frequently from a frame 20 to a frame 40. In other words, it may be seen that there is a transition portion around the frame 20 to the frame 40, and it is a transition portion in which it is determined that a combination is not included. In this case, for example, it is considered that a motion corresponding to an extra arm swing is performed.

Figure 17:
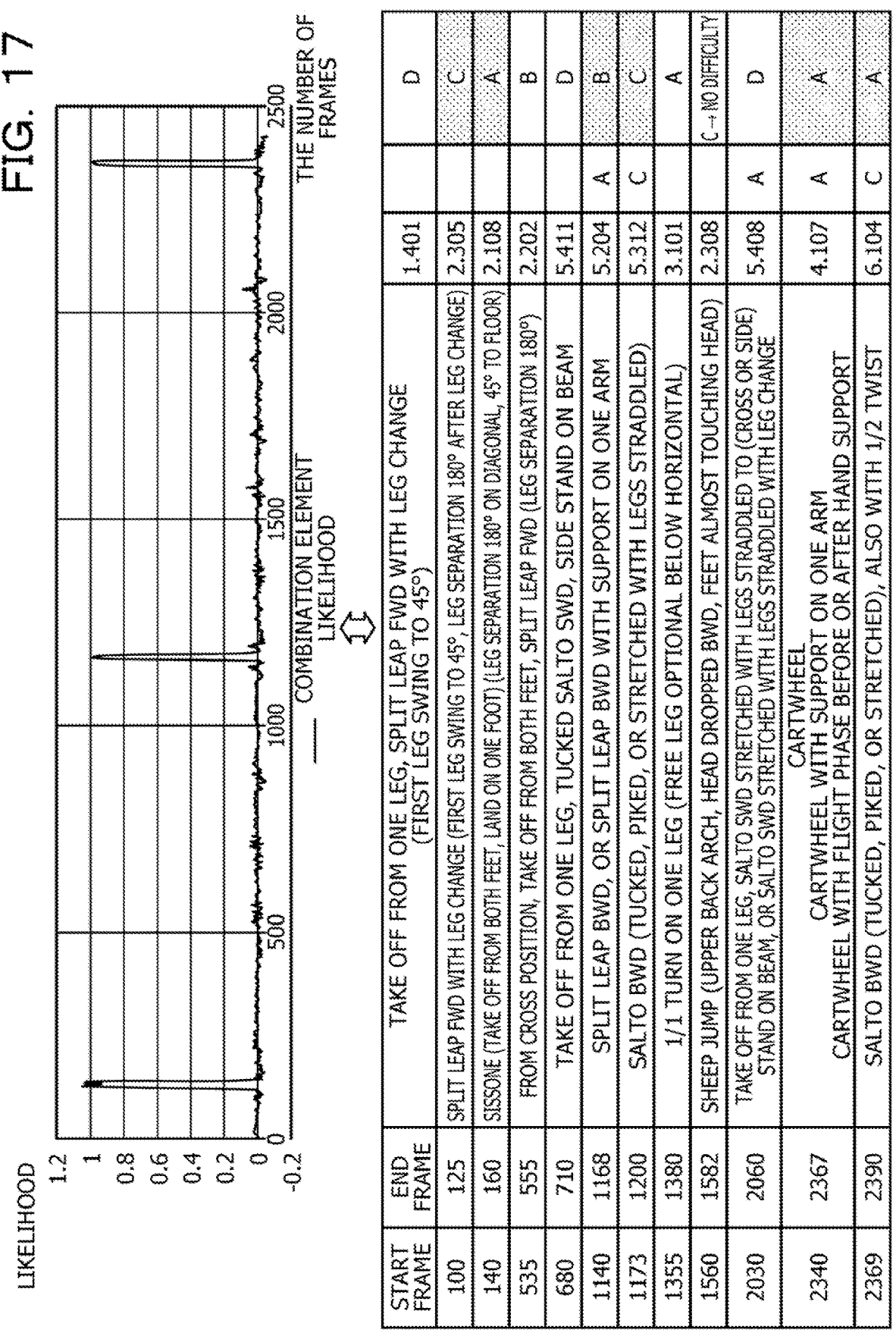
FIG. 17 is a diagram for describing an example of verification of combination determination.

Next, a determination result of a combination in a series of performances will be described with reference to FIG. 17. FIG. 17 is a diagram for describing an example of verification of combination determination. An upper figure of FIG. 17 illustrates a determination result of a combination by the recognition device 50, and a lower figure of FIG. 17 illustrates a scoring result by a judge. Here, both will be described in comparison. In the lower figure of FIG. 17, the judge recognizes each of intervals between a frame 125 and a frame 140, between a frame 1168 and a frame 1173, and between a frame 2367 and a frame 2369 as combinations. On the other hand, in the determination result of a combination by the recognition device 50 illustrated in the upper figure of FIG. 17, a likelihood becomes around 1.0 in similar sections. Therefore, it may be seen that a combination of elements may be accurately determined by using the recognition device 50.

Second Embodiment

Incidentally, while the embodiment of the present invention has been described above, the present invention may be implemented in a variety of different modes in addition to the embodiment described above.

[Specification of Cutout Portion]

In the first embodiment, an example has been described in which, when learning is performed, a start position of a frame is determined with a random number to perform cutout. However, by setting a probability distribution of random numbers, particularly, it is possible to intensively learn a boundary between a motion portion and a transition portion and improve accuracy.

Figure 18A:
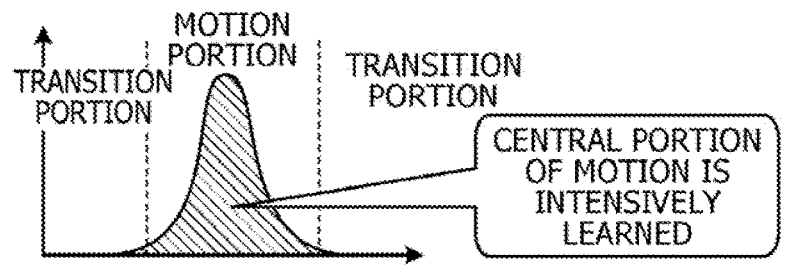
FIG. 18A, FIG. 18B, and FIG. 18C are diagrams for describing examples of determination of a random number at a cutout portion.
Figure 18B:
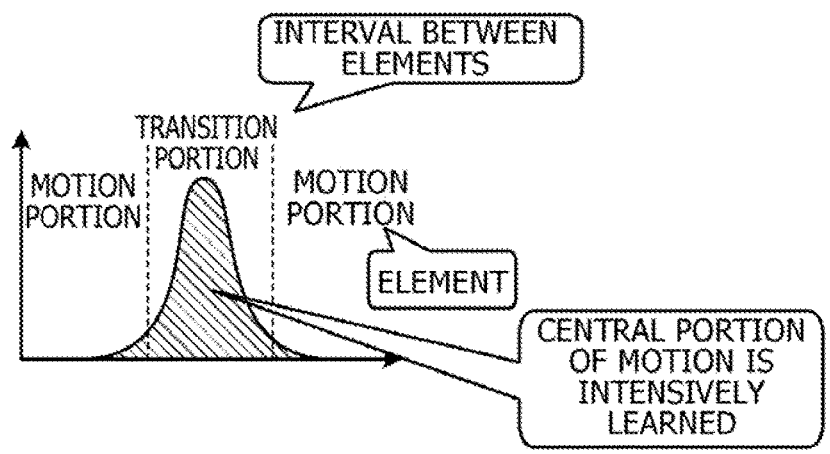
Figure 18C:
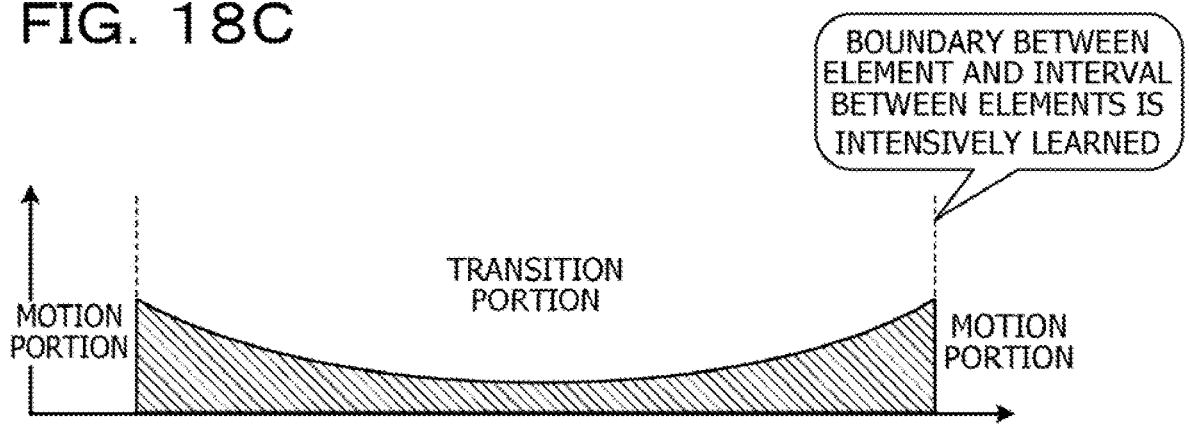

FIG. 18A, FIG. 18B, and FIG. 18C are diagrams for describing examples of determination of a random number at a cutout portion. As illustrated in FIG. 18A, in a case where a motion portion is cut out, a probability distribution at the time of cutting out is assumed to be a normal distribution (for example, standard deviation σ=3). Similarly, as illustrated in FIG. 18B, in a case where a short transition portion in which the number of frames is less than a threshold is cut out, a probability distribution at the time of cutting out is assumed to be the normal distribution. In this way, it is possible to suppress that "a boundary between a motion portion and a transition portion is also learned with the same weight, and boundaries are mixed", which occurs in a case where learning is performed in a uniform distribution, and an intermediate part between elements may be intensively learned.

Furthermore, as illustrated in FIG. 18C, in a case where a long transition portion in which the number of frames is equal to or greater than the threshold is cut out, a probability distribution at the time of cutting out is assumed to be a beta distribution (for example, a=0.5 and b=0.5). In this way, it is possible to suppress that "a portion unrelated to a motion is also learned with the same weight", which occurs in a case where learning is performed in a uniform distribution, and around a boundary between a motion portion and a transition portion may be learned with a little heavier weight.

[Another Example of Recognition Processing]

For example, in the first embodiment, an example has been described in which, after the transition portion is extracted by using the model A of the transition portion evaluation model 55, the transition portion is evaluated by using the model B of the transition portion evaluation model 55. However, the present invention is not limited thereto. For example, in a case where the transition portion is known in advance, the evaluation of the transition portion may be executed by using only the model B of the transition portion evaluation model 55.

Figure 19:
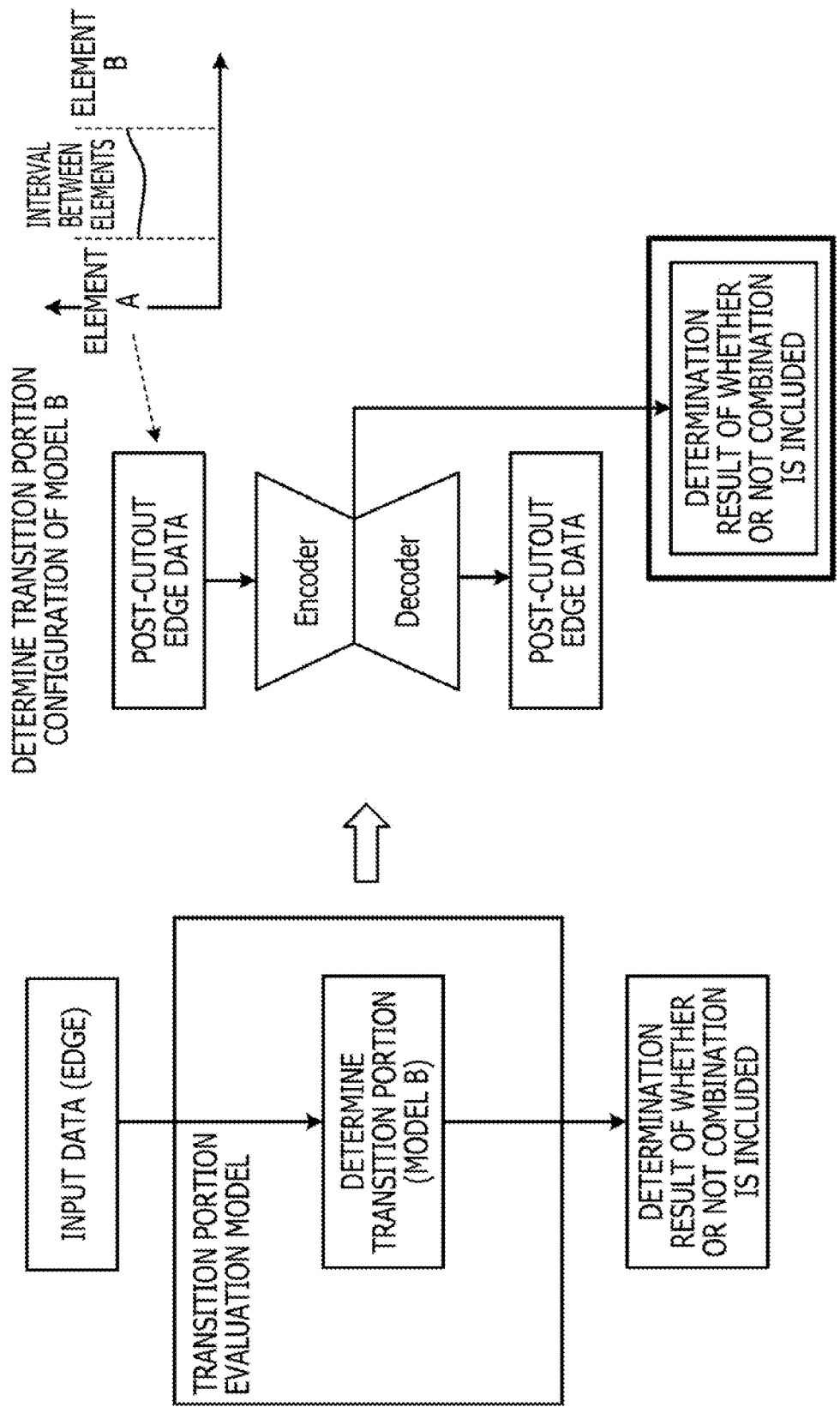
FIG. 19 is a diagram for describing another example of the recognition processing of a transition portion.

FIG. 19 is a diagram for describing another example of the recognition processing of a transition portion. As illustrated in FIG. 19, in a case where it is known that the transition portion to be evaluated is an interval between an element A and an element B, the recognition device 50 inputs edge data of the corresponding transition portion into the model B instead of the model A of the transition portion evaluation model 55. Then, the recognition device 50 acquires a determination result of whether or not a combination is included from the model B of the transition portion evaluation model 55, and evaluates whether the input transition portion corresponds to a combination or is a mere transition portion.

Figure 20:
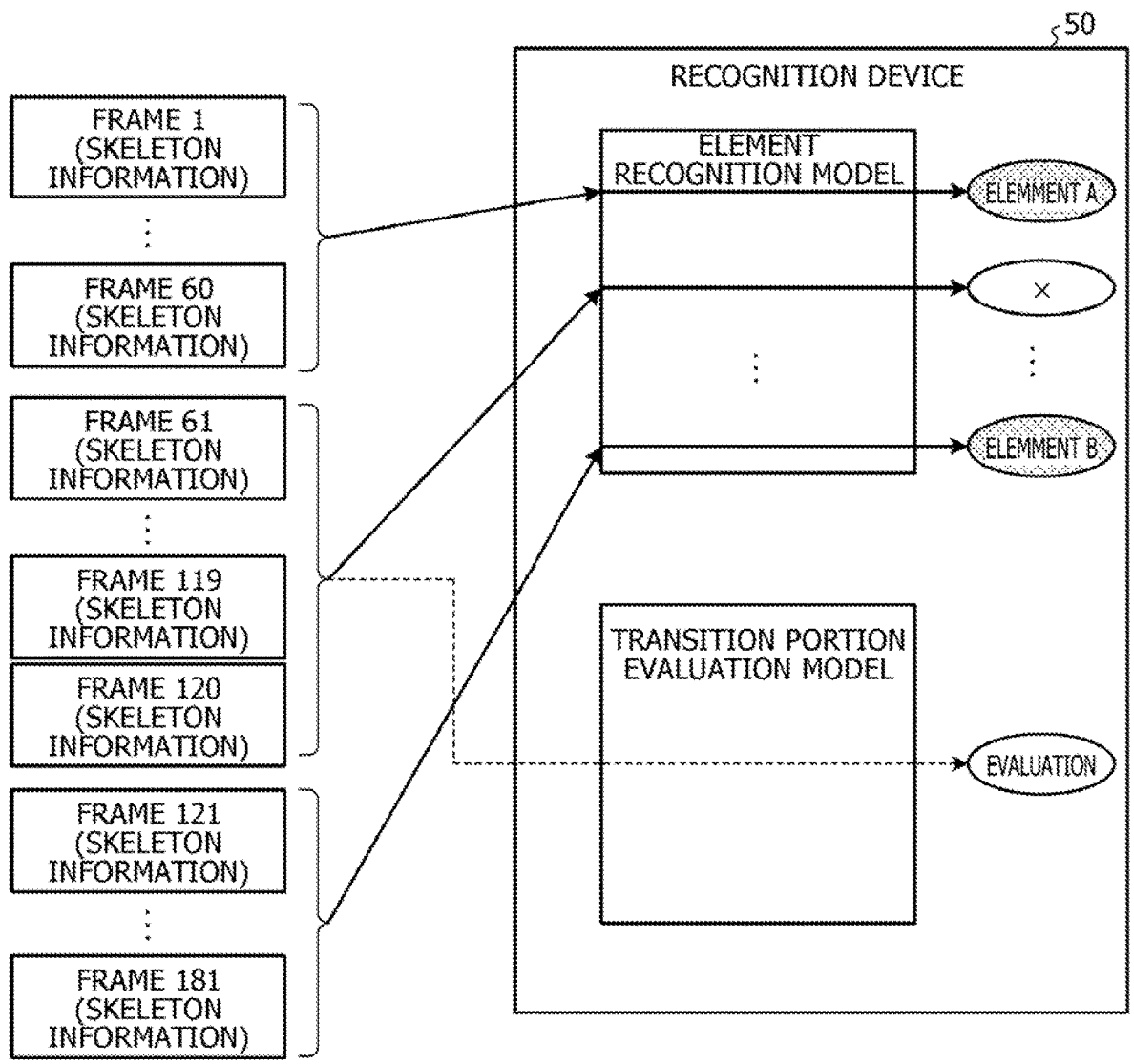
FIG. 20 is a diagram for describing specification of a known transition portion.

FIG. 20 is a diagram for describing specification of a known transition portion. As illustrated in FIG. 20, it is assumed that the element recognition model 54 recognizes a frame 1 to a frame 60 as the element A, does not recognize a frame 61 to a frame 120 as an element, and recognizes a frame 121 to a frame 181 as the element B. In this case, the combination evaluation unit 64 may specify the frame 61 to the frame 120 as a transition portion, directly input edge data of the transition portion into the model B of the transition portion evaluation model 55, and evaluate whether or not the transition portion corresponds to a combination. As a result, a time needed for evaluation of the transition portion may be shortened, and a real-time property may be improved.

Application Example

In the embodiments described above, the gymnastics competition has been described as an example, but the present invention is not limited thereto, and may be applied to other competitions in which athletes perform a series of elements and judges score the elements. Examples of other competitions include figure skating, rhythmic gymnastics, cheerleading, swimming diving, karate kata, and mogul air. For example, in the case of being applied to figure skating, it is possible to evaluate whether there is any extra motion during a transition between the first jump landing and the second jump start. Furthermore, it is possible to be applied not only to sports but also to posture detection of drivers of trucks, taxis, trains, or the like, posture detection of pilots, and the like. For example, in the case of being applied to health care, it is possible to evaluate whether there is any extra motion between a time when a foot leaves the ground and a time when the same foot lands on the ground again.

[Skeleton Information]

Furthermore, in the embodiments described above, an example has been described in which learning or recognition using the position of each of the 18 joints is performed. However, the present invention is not limited thereto, and one or more joints may be specified to execute learning or the like. Furthermore, in the embodiments described above, the position of each joint has been exemplified and described as an example of the skeleton information. However, the present invention is not limited thereto, and various types of information may be adopted as long as the information may be defined in advance, such as an angle of each joint, an orientation of limbs, and an orientation of a face.

[Numerical Values or the Like]

The numerical values and the like used in the embodiments described above are merely examples, and do not limit the embodiments and may be optionally set and changed. Furthermore, the number of frames or the like is also an example and may be optionally set and changed. Furthermore, in the first embodiment, an example using edge data has been described. However, the present invention is not limited to this, and for example, relative coordinate data indicating a relative position of each joint may be used. Furthermore, in the case of a section including a first frame at a start of a performance and a frame at an end of the performance, data padding or the like for adjusting to the another number of frames (for example, 60) may be optionally executed. Furthermore, not only neural networks but also various types of machine learning and deep learning may be used for the model.

[System]

Pieces of information including a processing procedure, a control procedure, a specific name, various types of data, and parameters described above or illustrated in the drawings may be optionally changed unless otherwise specified.

Furthermore, each component of each device illustrated in the drawings is functionally conceptual and does not necessarily have to be physically configured as illustrated in the drawings. For example, specific forms of distribution and integration of each device are not limited to those illustrated in the drawings. In other words, all or a part thereof may be configured by being functionally or physically distributed or integrated in optional units depending on various types of loads, usage situations, or the like. Furthermore, each 3D laser sensor may also be built in each device or may also be connected by communication or the like as an external device of each device.

For example, recognition of an element and evaluation of a combination may also be implemented in separate devices. Furthermore, the learning device 10, the recognition device 50, and the scoring device 90 may be implemented by an optional combination of devices. Note that the skeleton information generation unit 61 is an example of an acquisition unit, the combination evaluation unit 64 is an example of a specification unit and an evaluation unit, and the output unit 65 is an example of an output unit.

Moreover, all or an optional part of individual processing functions performed in each device may be implemented by a CPU and a program analyzed and executed by the corresponding CPU, or may be implemented as hardware by wired logic.

[Hardware]

Next, a hardware configuration of a computer such as the learning device 10, the recognition device 50, and the scoring device 90 will be described. Note that, since each device has a similar configuration, a computer 100 will be described here, and the recognition device 50 will be exemplified as a specific example.

Figure 21:
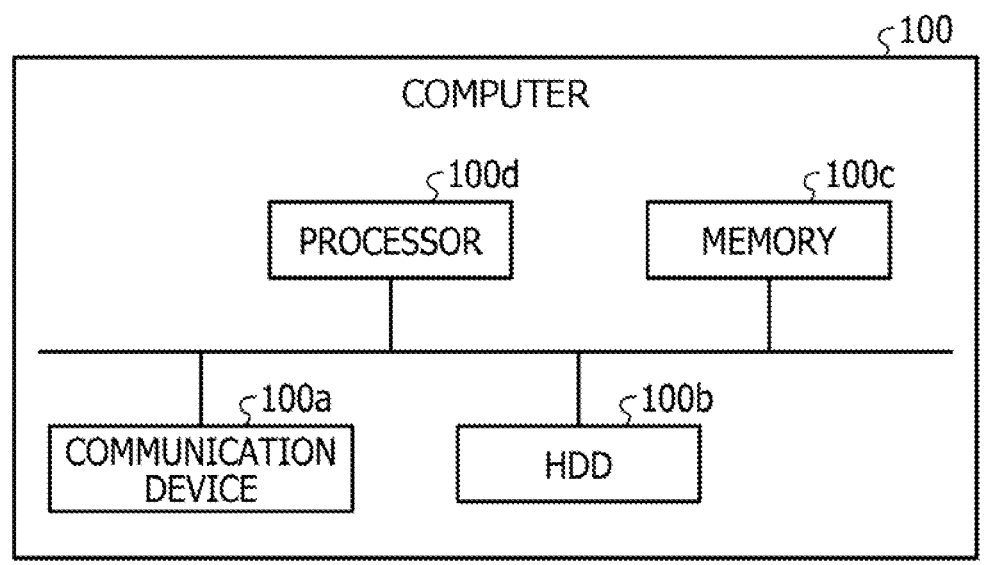
FIG. 21 is a diagram for describing an example of a hardware configuration.

FIG. 21 is a diagram for describing an example of the hardware configuration. As illustrated in FIG. 21, the computer 100 includes a communication device 100a, a hard disk drive (HDD) 100b, a memory 100c, and a processor 100d. Furthermore, the respective units illustrated in FIG. 21 are mutually connected by a bus or the like.

The communication device 100a is a network interface card or the like, and communicates with another server. The HDD 100b stores a program that operates the functions illustrated in FIG. 10 or the like, and a DB.

The processor 100d reads a program that executes processing similar to that of each processing unit illustrated in FIG. 10 from the HDD 100b or the like to develop the read program in the memory 100c, thereby operating a process for executing each function described with reference to FIG. 10 or the like. For example, this process executes a function similar to the function of each processing unit included in the recognition device 50. Specifically, taking the recognition device 50 as an example, the processor 100d reads a program having functions similar to the functions of the skeleton information generation unit 61, the preprocessing unit 62, the element recognition unit 63, the combination evaluation unit 64, the output unit 65, and the like from the HDD 100b or the like. Then, the processor 100d executes a process that executes processing similar to the processing of the skeleton information generation unit 61, the preprocessing unit 62, the element recognition unit 63, the combination evaluation unit 64, the output unit 65, and the like.

In this way, the computer 100 reads and executes a program, thereby operating as an information processing apparatus that executes a recognition method. Furthermore, the computer 100 may also implement functions similar to the functions of the embodiments described above by reading the program described above from a recording medium by a medium reading device and executing the read program described above. Note that a program mentioned in another embodiment is not limited to being executed by the computer 100. For example, the present invention may be similarly applied to a case where another computer or server executes the program, or a case where these cooperatively execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An evaluation method for a computer to execute a process comprising:
    acquiring a plurality of pieces of skeleton information in time series based on position information of joints of an object that executes a plurality of motions;
    specifying a transition period between a first motion and a second motion that follows the first motion, which are included in the plurality of motions based on the plurality of pieces of skeleton information;
    determining whether the transition period is related to a certain combination of motions by inputting skeleton information among the plurality of pieces of skeleton information that corresponds to the transition period into an evaluation model trained to evaluate a transition period between motions based on a plurality of pieces of skeleton information in time series; and
    outputting an evaluation result of the transition period by the evaluation model.

2. The evaluation method according to claim 1, wherein the specifying includes specifying the transition period between the first motion and the second motion by using an extraction model trained to extract a transition period between motions based on a plurality of pieces of skeleton information in time series of an object.

3. The evaluation method according to claim 2, wherein the process further comprising
    acquiring edge data that represents an orientation of connected skeletons by using the plurality of pieces of skeleton information in time series, wherein
    the specifying includes:
    inputting the edge data into the extraction model; and
    specifying the transition period based on an extraction result by the extraction model; wherein
    the determining includes:
    inputting the extraction result into the evaluation model; and
    determining based on an output result of the evaluation model.

4. The evaluation method according to claim 1, wherein the process further comprising:
    acquiring edge data that represents an orientation of connected skeletons by using the plurality of pieces of skeleton information in time series; and
    detecting the plurality of motions that includes the first motion and the second motion by using a specification model trained to specify a motion based on the edge data, wherein
    the specifying includes specifying skeleton information that corresponds to a period between the first motion and the second motion specified by the specification model among the plurality of pieces of skeleton information in time series as skeleton information that corresponds to the transition period.

5. The evaluation method according to claim 1, wherein the determining includes:
    acquiring a certain number of pieces of skeleton information from the skeleton information that corresponds to the transition period by using a random number according to a normal distribution when the transition period is less than a threshold,
    acquiring a certain number of pieces of skeleton information from the skeleton information that corresponds to the transition period by using a random number according to a beta distribution when the transition period is equal to or greater than the threshold, and
    evaluate the transition period by using the acquired skeleton information.

6. The evaluation method according to claim 1, wherein
    the acquiring includes acquiring skeleton information based on position information of joints of a performer who performs a performance of a gymnastics competition in time series,
    the specifying includes specifying a transition period between performances of the gymnastics competition based on the skeleton information in time series, and
    the determining includes determining based on an output result of the evaluation model
    that the transition period is a combination of elements when the transition period does not correspond to performance selected from stop between the elements, extra step between elements, contact of a foot with a beam between elements, loss of balance between elements, apparent stretch of a leg or hip in a first element before takeoff of a second element, and an extra arm swing.

7. A non-transitory computer-readable storage medium storing an evaluation program that causes at least one computer to execute a process, the process comprising:
    acquiring a plurality of pieces of skeleton information in time series based on position information of joints of an object that executes a plurality of motions;

specifying a transition period between a first motion and a second motion that follows the first motion, which are included in the plurality of motions based on the plurality of pieces of skeleton information;

determining whether the transition period is related to a certain combination of motions by inputting skeleton information among the plurality of pieces of skeleton information that corresponds to the transition period into an evaluation model trained to evaluate a transition period between motions based on a plurality of pieces of skeleton information in time series; and outputting an evaluation result of the transition period by the evaluation model.

8. The non-transitory computer-readable storage medium according to claim 7, wherein
the specifying includes specifying the transition period between the first motion and the second motion by using an extraction model trained to extract a transition period between motions based on a plurality of pieces of skeleton information in time series of an object.

9. The non-transitory computer-readable storage medium according to claim 8, wherein the process further comprising
acquiring edge data that represents an orientation of connected skeletons by using the plurality of pieces of skeleton information in time series, wherein
the specifying includes:
inputting the edge data into the extraction model; and
specifying the transition period based on an extraction result by the extraction model; wherein
the determining includes:
inputting the extraction result into the evaluation model; and
determining based on an output result of the evaluation model.

10. The non-transitory computer-readable storage medium according to claim 7, wherein the process further comprising:
acquiring edge data that represents an orientation of connected skeletons by using the plurality of pieces of skeleton information in time series; and
detecting the plurality of motions that includes the first motion and the second motion by using a specification model trained to specify a motion based on the edge data, wherein
the specifying includes specifying skeleton information that corresponds to a period between the first motion and the second motion specified by the specification model among the plurality of pieces of skeleton information in time series as skeleton information that corresponds to the transition period.

11. The non-transitory computer-readable storage medium d according to claim 7, wherein
the determining includes:
acquiring a certain number of pieces of skeleton information from the skeleton information that corresponds to the transition period by using a random number according to a normal distribution when the transition period is less than a threshold,
acquiring a certain number of pieces of skeleton information from the skeleton information that corresponds to the transition period by using a random number according to a beta distribution when the transition period is equal to or greater than the threshold, and
evaluate the transition period by using the acquired skeleton information.

12. The non-transitory computer-readable storage medium according to claim 7, wherein
the acquiring includes acquiring skeleton information based on position information of joints of a performer who performs a performance of a gymnastics competition in time series,
the specifying includes specifying a transition period between performances of the gymnastics competition based on the skeleton information in time series, and
the determining includes determining based on an output result of the evaluation model
that the transition period is a combination of elements when the transition period does not correspond to performance selected from stop between the elements, extra step between elements, contact of a foot with a beam between elements, loss of balance between elements, apparent stretch of a leg or hip in a first element before takeoff of a second element, and an extra arm swing.

13. An information processing apparatus comprising:
one or more memories; and
one or more processors coupled to the one or more memories and the one or more processors configured to
acquire a plurality of pieces of skeleton information in time series based on position information of joints of an object that executes a plurality of motions,
specify a transition period between a first motion and a second motion that follows the first motion, which are included in the plurality of motions based on the plurality of pieces of skeleton information,
determine whether the transition period is related to a certain combination of motions by inputting skeleton information among the plurality of pieces of skeleton information that corresponds to the transition period into an evaluation model trained to evaluate a transition period between motions based on a plurality of pieces of skeleton information in time series, and
output an evaluation result of the transition period by the evaluation model.

* * * * *